US012127009B2

(12) United States Patent
Hafeez

(10) Patent No.: US 12,127,009 B2
(45) Date of Patent: Oct. 22, 2024

(54) METHODS AND APPARATUS FOR LOW COMPLEXITY SPECTRUM SHARING

(71) Applicant: Charter Communications Operating, LLC, St. Louis, MO (US)

(72) Inventor: Abdulrauf Hafeez, Cary, NC (US)

(73) Assignee: Charter Communications Operating, LLC, St. Louis, MO (US)

(*) Notice: Subject to any disclaimer, the term of this patent is extended or adjusted under 35 U.S.C. 154(b) by 248 days.

(21) Appl. No.: 17/735,856

(22) Filed: May 3, 2022

(65) Prior Publication Data

US 2023/0328533 A1    Oct. 12, 2023

Related U.S. Application Data

(60) Provisional application No. 63/330,281, filed on Apr. 12, 2022.

(51) Int. Cl.
*H04W 16/14*     (2009.01)
*H04W 48/04*     (2009.01)

(52) U.S. Cl.
CPC ........... *H04W 16/14* (2013.01); *H04W 48/04* (2013.01)

(58) Field of Classification Search
CPC .... H04W 16/14; H04W 72/541; H04L 5/0062
See application file for complete search history.

(56) References Cited

U.S. PATENT DOCUMENTS 11,528,725 B1 * 12/2022 Qureshi ................ H04W 16/14
2022/0264591 A1 * 8/2022 Hannan ................ H04W 72/23

FOREIGN PATENT DOCUMENTS

EP    3879868 B1 * 11/2023 ........... H04W 16/14

OTHER PUBLICATIONS

Requirements for Commercial Operation in the U.S. 3550-3700 MHz Citizens Broadband Radio Service Band, CBRS WInnForum Standards, Wireless Innovation Forum, Mar. 11, 2020, 81 Pages, Document WINNF-TS-0112, Version V1.9.1, The Software Defined Radio Forum Inc.

* cited by examiner

*Primary Examiner* — Kevin Kim
(74) *Attorney, Agent, or Firm* — Straub & Straub; Michael P. Straub; Stephen T. Straub

(57) ABSTRACT

Methods and apparatus for implementing a spectrum access controller (SAC) which protects a protected entity from excessive interference are described. A spectrum access controller (SAC) divides the coverage contour of the entity to be protected into geospatial zones called protection zones. Each protection zone is protected against interference from a neighboring area called an interference neighborhood. Each interference neighborhood is divided into interference zones based on their interference potential or distance from the protection zone. Potential interferers are grouped based on their location in the interference zones or interference potential. The interference quota for the protection zone is divided among the potential interferers in each group/zone. The quota may be divided unequally among groups/zones, e.g., based on their overall interference potential or proximity to the protection zone, or number of interferers. Each interferer is assigned a transmit power or effective isotropic radiated power (EIRP) to meet its individual interference quota.

20 Claims, 12 Drawing Sheets

| FIGURE 3A |
|---|
| FIGURE 3B |
| FIGURE 3C |
| FIGURE 3D |

| FIGURE 6A | FIGURE 6B | FIGURE 6C | FIGURE 6D |

# METHODS AND APPARATUS FOR LOW COMPLEXITY SPECTRUM SHARING

RELATED APPLICATIONS

The present application claims the benefit of U.S. Provisional Application Ser. No. 63/330,281 which was filed on Apr. 12, 2022 and which is hereby expressly incorporated by reference in its entirety.

FIELD

The present application relates to supporting spectrum sharing and, more particularly, to methods and apparatus for implementing a low complexity approach for interference management for a protected entity.

BACKGROUND

Spectrum sharing in Citizens Broadband Radios Services (CBRS) band (3550-3700 MHz) is done among three tiers of users—incumbents, priority access licensees (PAL) and generalize authorized access (GAA) users, in respective order of priority.

Both incumbent and PAL users' equipment is protected against aggregate interference arising from lower and same priority users' equipment by the spectrum access system (SAS) based on FCC rules.

PAL users have a problem during Dynamic Protection Areas (DPA) activations. When their equipment is moved by SAS from the primary channel assignments to other temporary channels, they may not be fully protected from interference.

GAA users are not protected from interference. Rather, the WlnnForum and OnGo Alliance standards provide guidance for coexistence among GAA users' equipment.

For protecting PAL users during DPA activations and for GAA coexistence, SAS may not consider aggregate interference from other CBSDs as a criterion for protection/coexistence due to complexity reasons.

As a result, PAL and GAA users may either be: i) under-protected from interference leading to performance issues, or ii) over-protected from interference leading to under-utilization of spectrum.

As specified in WinnForum TS-0112, Version V1.9.1 11 Mar. 2020 PAL users are protected by the Iterative Allocation Process (IAP). The process iteratively allocates the total interference quota (Q) allowed for protecting a PAL entity among interfering user devices (I) within proximity of the PAL entity.

All interfering user devise are added to a list and allocated interference quota equally (Q/I). Devices that meet the quota are removed from the list. Their unused quota (Q_unused) is added to the total quota. Remaining devices (I_remain) that meet the remaining quota divided equally among them ((Q+Q_unused)/(I_remain)) are again removed from the list and their unused quota is added to the remaining quota, and so on.

When all the remaining devices exceed the remaining quota divided equally among them, then each of them is powered down by 1 dB and the process is repeated until all devices are removed from the list with either full requested power, reduced power or zero power, resulting in an assigned power or EIRP for each interfering user device.

IAP is an iterative process that requires a large number of computations for calculating: i) pathlosses between each interfering user and each point on the protected entity's protection contour, ii) aggregate interference at each protection point, and iii) iterations to stepwise reduce interferer power. The complexity becomes high as the number of interfering CBSDs becomes large.

In view of the above it should be appreciated that there is a need for methods and/or apparatus which can be used to manage, avoid, limit or otherwise control interference in a manner which is easy to implement, e.g., with fewer computations, then IAP in at least some cases.

SUMMARY

Various exemplary embodiments are directed to methods and apparatus for a spectrum access controller (SAC) which protects a protected entity from excessive interference are described. The methods used by the SAC in some embodiments are less computationally intensive than the known IAP processes which can involve a large number of iterative steps. The protected entity may be, and sometimes is, a protected access license (PAL) base station, which is being moved temporarily from its primary PAL channel to a secondary channel, e.g., a GAA channel, in response to a dynamic protection area (DPA) activation. In one exemplary embodiment, a spectrum access controller (SAC) divides the coverage contour of the entity to be protected into geospatial zones called protection zones. Each protection zone is protected against interference located within a certain distance from the protection zone called interference neighborhood. Each interference neighborhood is divided into interference zones based on their interference potential or distance from the protection zone. Potential interferers, e.g., non-PAL CBSDs, are grouped based on their location in the interference zones or interference potential. The interference quota for the protection zone is divided equally among the potential interferers in each group/zone. The quota may be divided unequally among groups/zones, e.g., based on their overall interference potential or proximity to the protection zone, or number of interferers. Each interferer is assigned a transmit power or effective isotropic radiated power (EIRP) to meet its individual interference quota. Assignments for an interferer that affects multiple protection zones are combined over the protection zones, e.g., by choosing the most conservative assignment.

Various exemplary embodiments provide a low complexity method for spectrum sharing. In some such embodiments, pathloss is calculated between an interfering user and a protection zone, aggregate interference is calculated per (protection zone, interference zone), and the process in not iterative.

Numerous variations on the above described methods and embodiments will be discussed in the detailed description which follows.

DETAILED DESCRIPTION

Figure 1:
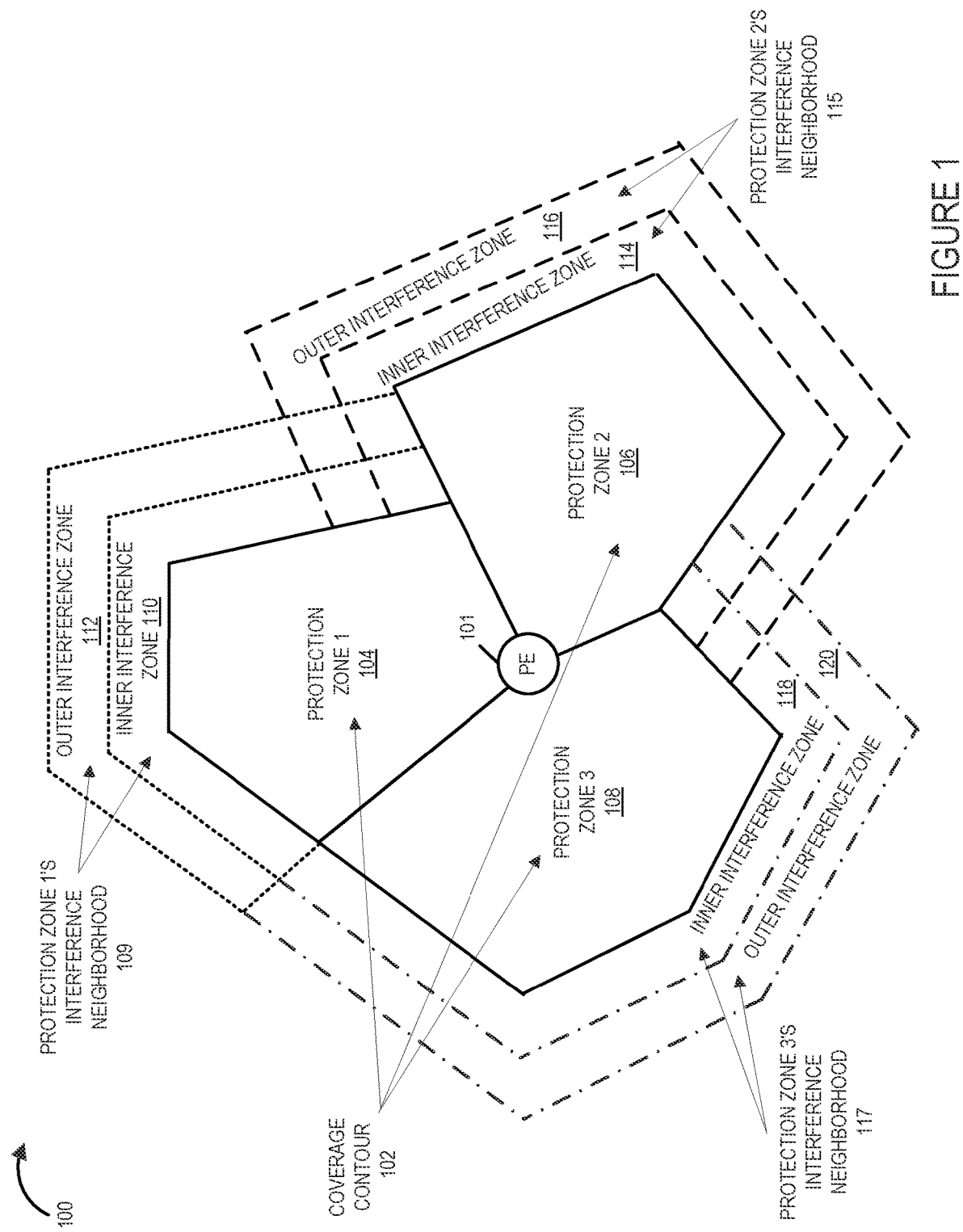
FIG. 1 is a drawing illustrating an exemplary coverage contour of a protected entity which is divided into three geospatial protection zones and further illustrating exemplary interference neighborhoods including exemplary interference zones, in accordance with an exemplary embodiment.

FIG. 1 is a drawing 100 illustrating an exemplary coverage contour 102 of a protected entity (PE) 101, e.g., a PAL device such as a PAL base station, which has been moved from its primary channel to a secondary channel, e.g., a GAA channel, as part of Dynamic Protection Area (DPA) activation. The coverage contour 102 is divided into three geospatial protection zones (protection zone 1 104, protection zone 2 106, protection zone 3 108). Each protection zone has a corresponding interference neighborhood. Interference neighborhood 109 corresponds to protection zone 1 104. Interference neighborhood 115 corresponds to protection zone 2 106. Interference neighborhood 117 corresponds to protection zone 3 108. Each interference neighborhood includes a plurality of interference zones. Interference neighborhood 109 includes inner interference zone 110 and outer interference zone 112. Interference neighborhood 115 includes inner interference zone 114 and outer interference zone 116. Interference neighborhood 117 includes inner interference zone 118 and outer interference zone 120.

Figure 2:
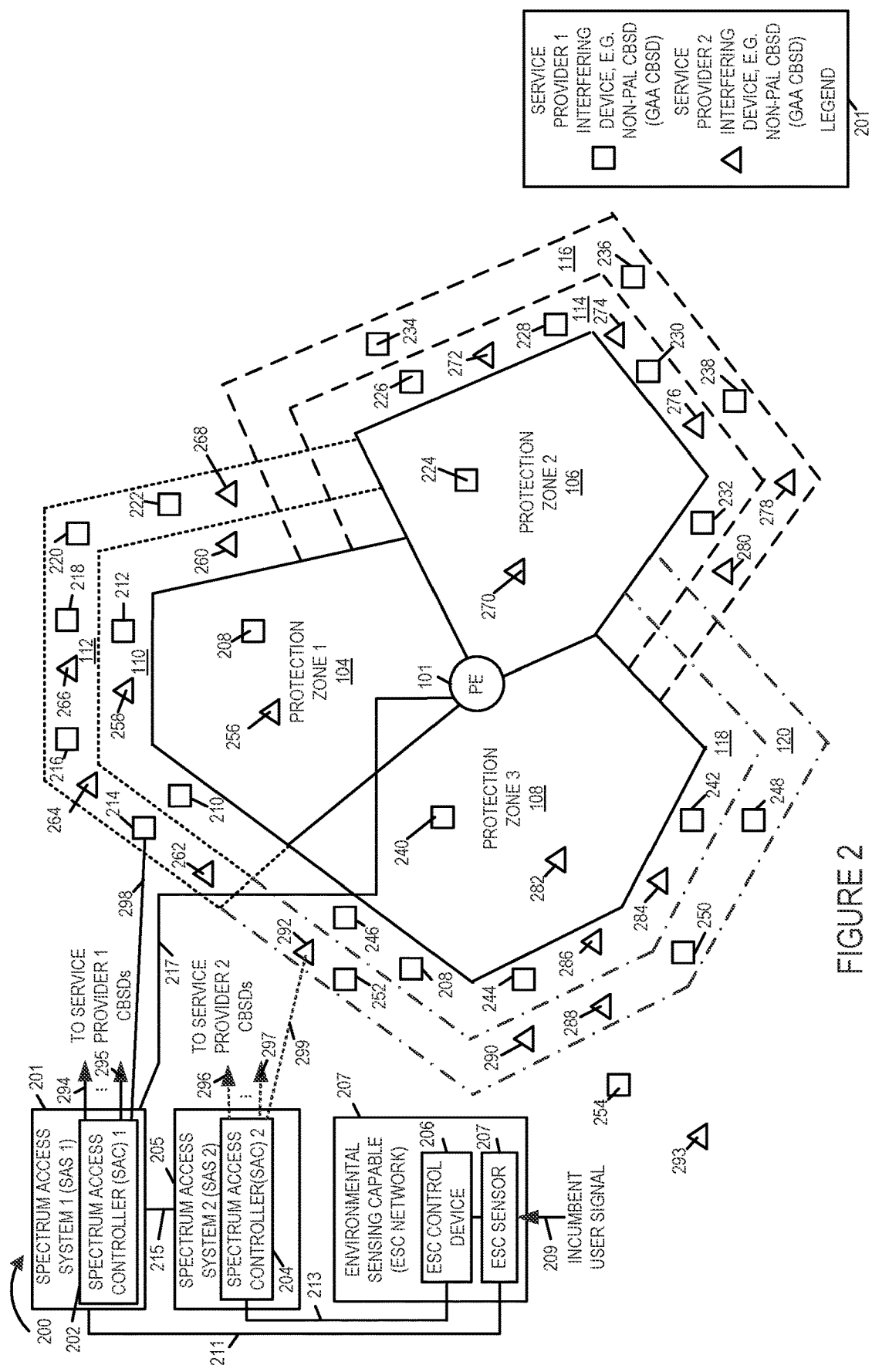
FIG. 2 is a drawing of an exemplary communications system including a plurality of spectrum access controllers (SACs), and interfering devices, e.g., non-PAL CBSDs, said communications system implementing a method of low complexity spectrum sharing, e.g., with regard to the protected entity and exemplary protection contour of FIG. 1, in accordance with an exemplary embodiment.

FIG. 2 is a drawing of an exemplary communications system 200 including a plurality of spectrum access controllers (SACs), and interfering devices, e.g., non-PAL CBSDs (GAA CBSDs), said communications system 200 implementing a method of low complexity spectrum sharing, e.g., with regard to the protected entity 101 and exemplary protection contour 102 of FIG. 1, in accordance with an exemplary embodiment. Exemplary system 200 includes a first spectrum access system, SAS 1 201, including first spectrum access controller, SAC 1 202, a second spectrum access system, SAS 2 205, including a second spectrum access controller, SAC 2 204, an environmental sensing capable (ESC) network 207 including an ESC control device 206 and an ESC sensor 207, which are coupled together, the protected entity (PE) 101, e.g., a PAL base station, which is coupled to SAC 1 202 via communications link 217, a first plurality of interfering devices, e.g., non-PAL CBSDs, which are coupled to SAC 1 202, and a second plurality of interfering devices, e.g., non-PAL CBSDs, which are coupled to SAC 2 204. In some embodiments the SACs are spectrum access systems (SASs) or servers rather than simply a component within the SAS. Legend 201 illustrates that interfering devices of the first plurality of interfering devices, which are service provider 1 interfering devices, e.g. service provider 1 CBSDs, are represented as small squares, and interfering devices of the second plurality of interfering devices, which are service provider 2 interfering devices, e.g. service provider 2 CBSDs, are represented as small triangles.

The first plurality of interfering devices, e.g., non-PAL CBSDs, includes interfering devices 208, 210, 212, 214, 216, 218, 220, 222, 224, 226, 228, 230, 232, 234, 236, 238, 240, 242, 244, 246, 248, 250, 252, 252 and 254. Each interfering device of the first plurality of interfering devices is coupled to SAC 1 202 via a communication link (294, . . . 295). Solid line 298 is shown to illustrate a communications link between exemplary interfering device 214, e.g., a non-PAL CBSD, and SAC 1 202.

Interfering device 208, which is located in protection zone 1 104, is restricted from operating, with regard to the protected spectrum. Interfering devices 210 and 212, which are located in inner interference zone 110, corresponding to protection zone 1 104, are managed by SAC 1 202, with regard to whether or not a particular interfering device (210, 212) is allowed to use the protected spectrum and, if allowed, its transmit power level or effective isotropic radiated power (EIRP). Interfering devices 214, 216, 218, 220 and 222, which are located in outer interference zone 112, corresponding to protection zone 1 104, are managed by SAC 1 202, with regard to whether or not a particular interfering device (214, 216, 218, 220, 222) is allowed to use the protected spectrum and, if allowed, its transmit power level or effective isotropic radiated power (EIRP).

Interfering device 224, which is located in protection zone 2 106, is restricted from operating, with regard to the protected spectrum. Interfering devices 226, 228, 230 and 232, which are located in inner interference zone 114, corresponding to protection zone 2 106, are managed by SAC 1 202, with regard to whether or not a particular interfering device (226, 228, 230, 232) is allowed to use the protected spectrum and, if allowed, its transmit power level or effective isotropic radiated power (EIRP). Interfering devices 234, 236 and 238, which are located in outer interference zone 116, corresponding to protection zone 2 106, are managed by SAC 1 202, with regard to whether or not a particular interfering device (234, 236, 238) is allowed to use the protected spectrum and, if allowed, its transmit power level or effective isotropic radiated power (EIRP).

Interfering device 240, which is located in protection zone 3 108, is restricted from operating, with regard to the protected spectrum. Interfering devices 242, 244 and 246, which are located in inner interference zone 118, corresponding to protection zone 3 108, are managed by SAC 1 202, with regard to whether or not a particular interfering device (242, 246, 248) is allowed to use the protected spectrum and, if allowed, its transmit power level or effective isotropic radiated power (EIRP). Interfering devices 248, 250 and 252, which are located in outer interference zone 120, corresponding to protection zone 3 108, are managed by SAC 1 202, with regard to whether or not a particular interfering device (248, 250, 252) is allowed to use the protected spectrum and, if allowed, its transmit power level or effective isotropic radiated power (EIRP).

Interfering device 254 is located outside the protection zones 104, 106 and 108 and outside the interference zones 110, 112, 114, 116, 118 and 120, and is not affected with regard to the protected spectrum for PE 101, and it may continue operations as normal.

The second plurality of interfering devices includes interfering devices 256, 258, 260, 262, 264, 266, 268, 270, 272, 274, 276, 278, 280, 282, 284, 286, 288, 290, 292 and 293. Each interfering device of the second plurality of interfering devices is coupled to SAC 2 204 via a communication link (296, . . . 297). Dotted line 299 is shown to illustrate a communications link between exemplary interfering device 292, e.g., a non-PAL CBSD, and SAC 2 204.

Interfering device 256, which is located in protection zone 1 104, is restricted from operating, with regard to the protected spectrum. Interfering devices 258 and 260, which are located in inner interference zone 110, corresponding to protection zone 1 104, are managed by SAC 2 204, with regard to whether or not a particular interfering device (258, 260) is allowed to use the protected spectrum and, if allowed, its transmit power level or effective isotropic radiated power (EIRP). Interfering devices 262, 264, 266 and 268, which are located in outer interference zone 112, corresponding to protection zone 1 104, are managed by SAC 2 204, with regard to whether or not a particular interfering device (262, 264, 266, 268) is allowed to use the protected spectrum and, if allowed, its transmit power level or effective isotropic radiated power (EIRP).

Interfering device 270, which is located in protection zone 2 106, is restricted from operating, with regard to the protected spectrum. Interfering device 272, 274 and 276, which are located in inner interference zone 114, corresponding to protection zone 2 106, are managed by SAC 2 204, with regard to whether or not a particular interfering device (272, 274, 276) is allowed to use the protected spectrum and, if allowed, its transmit power level or effective isotropic radiated power (EIRP). Interfering devices 278 and 280, which are located in outer interference zone 116, corresponding to protection zone 2 106, are managed by SAC 2 204, with regard to whether or not a particular base station (278, 280) is allowed to use the protected spectrum and, if allowed, its transmit power level or effective isotropic radiated power (EIRP).

Interfering device 282, which is located in protection zone 3 108, is restricted from operating, with regard to the protected spectrum. Interfering devices 284 and 286, which are located in inner interference zone 118, corresponding to protection zone 3 108, are managed by SAC 2 204, with regard to whether or not a particular interfering device (284, 286) is allowed to use the protected spectrum and, if allowed, its transmit power level or effective isotropic radiated power (EIRP). Interfering devices 288, 290 and 292, which are located in outer interference zone 120, corresponding to protection zone 3 108, are managed by SAC 2 204, with regard to whether or not a particular interfering device (288, 290, 292) is allowed to use the protected spectrum and, if allowed, its transmit power level or effective isotropic radiated power (EIRP).

Interfering device 293 is located outside the protection zones 104, 106 and 108 and outside the interference zones 110, 112, 114, 116, 118 and 120, and is not affected with regard to the protected spectrum for PE 101, and it may continue operations as normal.

ESC control device 206 is coupled to spectrum access system 1 201 via communications link 211. ESC control device 206 is further coupled to spectrum access system 2 205, via communications link 213. The ESC sensor 207, monitors for incumbent user signals and detects incumbent user signal 209. The ESC sensor 207 notifies the ESC control device 206 of the detected incumber user and information identifying the channel(s) of the shared spectrum which are to be protected. The ESC control device 206 notifies the SASs (201, 205) and thus the SAC component of the SAS where the SAC is a separate component, e.g., via a DPA activation signal, that protection, with regard to specified shared spectrum, is to be provided for a detected incumber user, and further provides information such as a coverage contour for the protected incumbent user or information used to generate a contour coverage for the protected incumbent user. In some embodiments, the ESC control device 206 further provides to SAC 202 information indicating a suggested secondary channel to which to move a PAL user, e.g. PE 101, which is impacted, and information such as a coverage contour for the protected entity 101 or information used to generate a contour coverage for the protected entity.

In response to the received DPA activation signal, the SAS 201 temporarily suspends the grant to PE 101 (e.g., a PAL base station) to use the shared spectrum of its primary channel (which is now to be used by the incumbent device). SAS 1 201 reassigns PE 101, from its primary channel (which is a PAL channel) to a secondary channel of shared spectrum, e.g., a channel (which the incumbent is not using, which is not a primary PAL channel, and which does include GAA users). In one example, the primary channel is one of the PAL channels within 3550-3650 GHz range (associated with incumbent, PAL and GAA users), to which the PE 101 has a license, which is temporarily suspended, and the secondary channel is a channel which is a non-PAL channel, e.g. a channel in the 3650 MHz-3700 MHz range (associated with incumbent and GAA users).

Spectrum access controller 1 202 is coupled to spectrum access controller 2 204 via communications link 215, via which the two SACs interchange signaling, e.g., notifications, signaling commands, signaling acknowledgments, and/or collaborative signaling. In some embodiments, SAC 1 202 acts as master, and SAC 2 acts as a slave. In some other embodiments, SAC 1 202 and SAC 2 204 act in collaboration, e.g., reaching consensus on overall spectrum management decisions. The communications system 200 further includes a plurality of end nodes, e.g., user equipments (UEs), which may communicate with protected entity 101, e.g., a PAL base station, and/or with the interfering devices, e.g., non-PAL CBSDs, e.g., using shared spectrum when the interfering devices are allowed to operate.

Figure 3A:
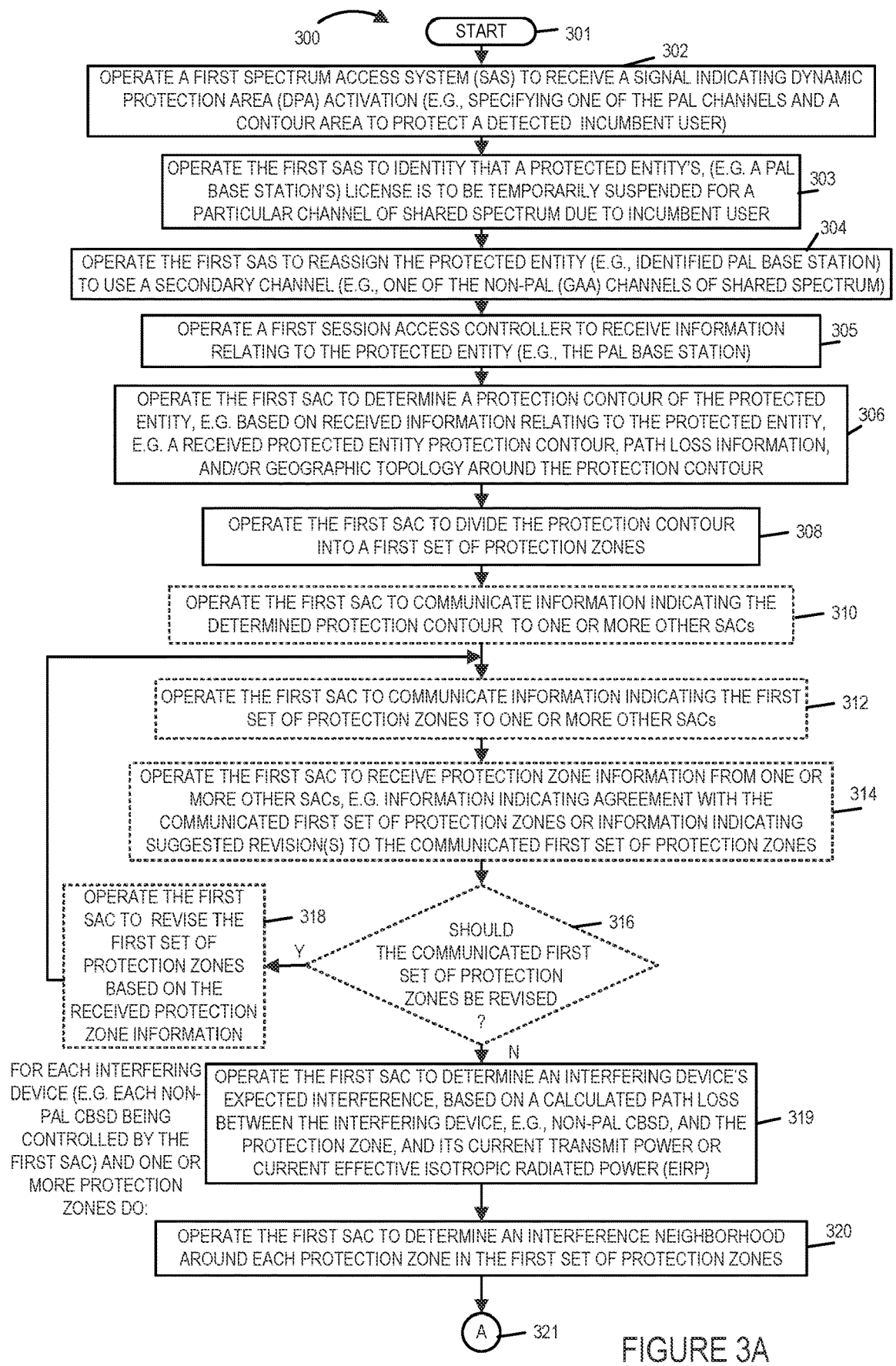
FIG. 3A is a first part of a flowchart of an exemplary method of implementing low complexity spectrum sharing in accordance with an exemplary embodiment.
Figure 3B:
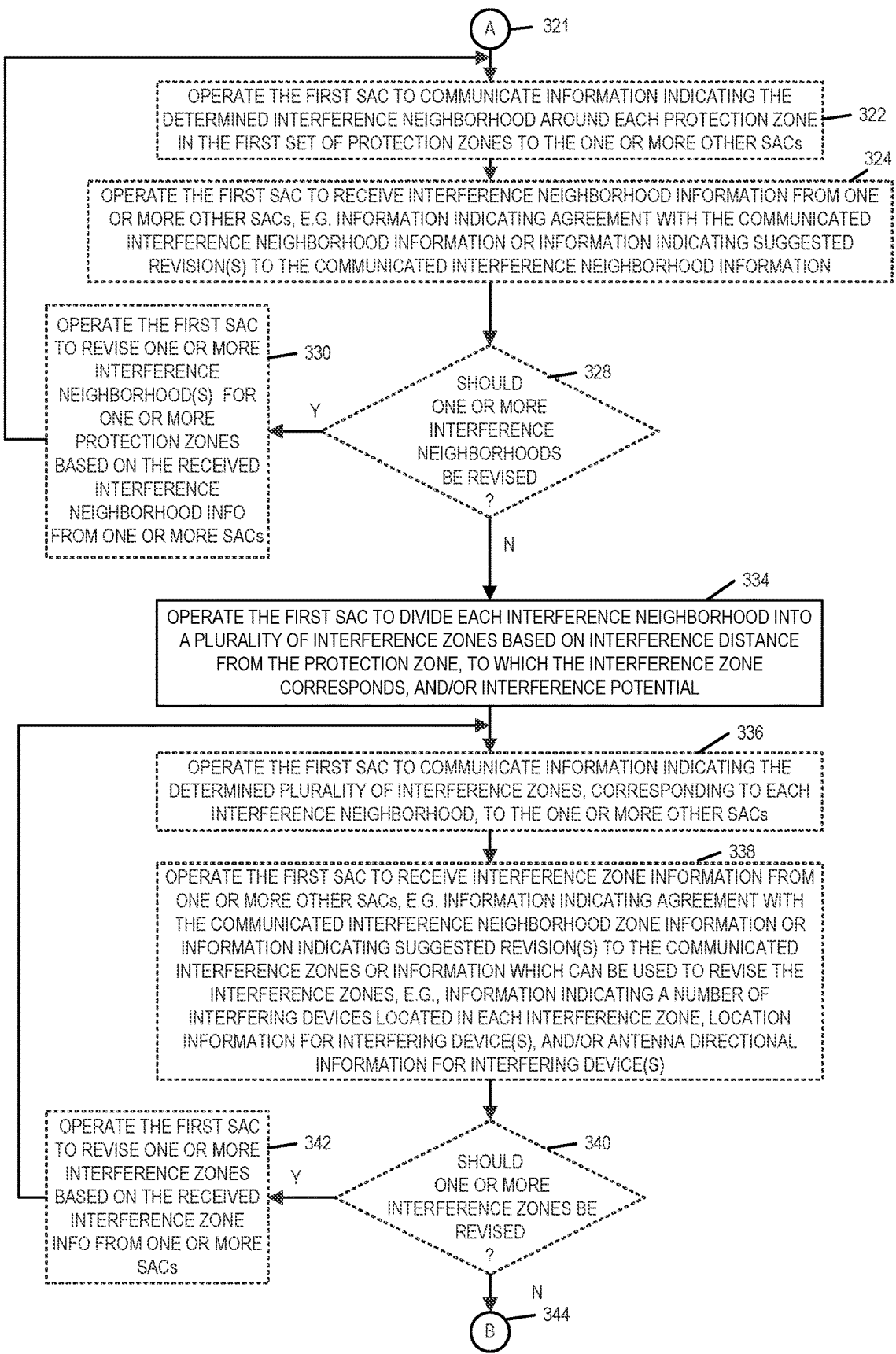
FIG. 3B is a second part of a flowchart of an exemplary method of implementing low complexity spectrum sharing in accordance with an exemplary embodiment.
Figure 3C:
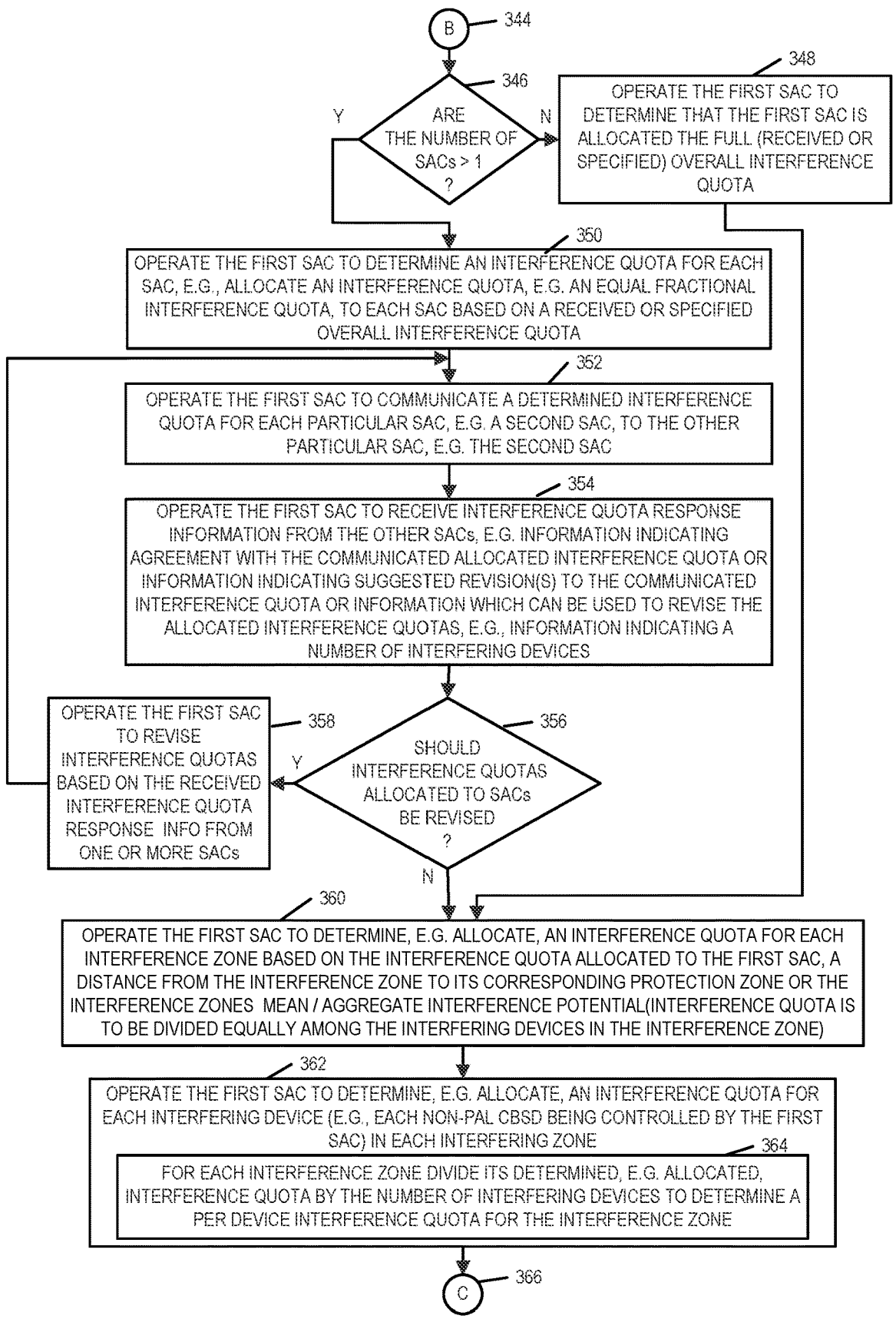
FIG. 3C is a third part of a flowchart of an exemplary method of implementing low complexity spectrum sharing in accordance with an exemplary embodiment.
Figures 3, 3D:
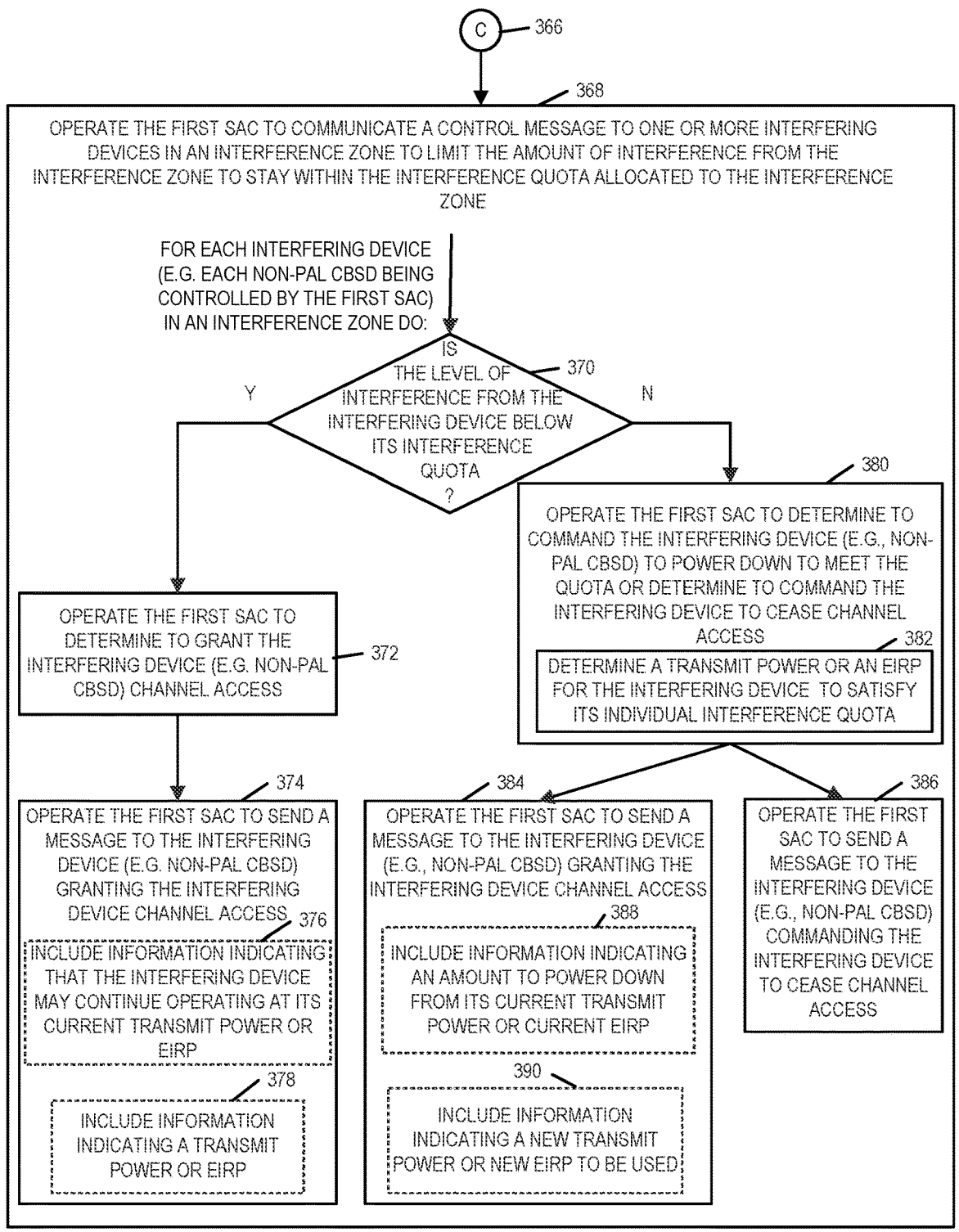
FIG. 3D is a fourth part of a flowchart of an exemplary method of implementing low complexity spectrum sharing in accordance with an exemplary embodiment.
FIG. 3 comprises the combination of FIG. 3A, FIG. 3B, FIG. 3C and FIG. 3D.

FIG. 3, comprising the combination of FIG. 3A, FIG. 3B, FIG. 3C and FIG. 3D, is flowchart 300 of an exemplary method of implementing low complexity spectrum sharing, e.g., in the CBRS band (3550-3700 MHz), in accordance with an exemplary embodiment. Operation starts in step 301, in which a communications system, e.g., communications system 200 of FIG. 2, is powered on and initialized. The communications system 200 includes a first spectrum access controller (SAC 1) 202, a protected entity 101, e.g., a Priority Access Licensee (PAL) base station, and a plurality of interfering devices, e.g., non-PAL CBSDs (GAA CBSDs). In some embodiments, the communications system includes one or more additional SACs, e.g., a second SAC, SAC 2 204. Operation proceeds from start step 301 to step 302. In step 302 a first SAS, e.g., SAS 201 including a first SAS 202, receives a signal, e.g., message, indicating dynamic protection area (DPA) activation. In some embodiments, the signal, e.g., message conveying the DPA activation, specifies one of PAL channels and a contour area to protect a detected incumbent user. Operation proceeds from step 302 to step 303.

In step 303 the first SAS identifies that a protected entity's (e.g. a PAL base station's) license is to be temporarily suspended for a particular channel of shared spectrum due to incumbent user. Operation proceeds from step 303 to step 304. In step 304 the first SAS reassigns the protected entity, e.g., protected entity 101 (e.g. a PAL base station being controlled by SAS 201), to (temporarily) use a secondary channel (e.g., one of the non-PAL (GAA) channels of shared spectrum which is unaffected by the GPA activation, e.g., a shared spectrum channel which supports incumbent users and GAA users but for which PAL licenses are not granted) in response to said received signal, e.g. said DPA activation signal. For example, the secondary channel is one of the channels within shared frequency spectrum of 3650 MHz-37000 MHz, and the protected entity (protected device such as PAL base station), was moved from a PAL channel, which was its primary channel, said primary channel being within shared frequency spectrum of 3550 MHz-3650 MHz. Operation proceeds from step 304 to step 305.

In step 305 the first session access controller (SAC) 202 receives information relating to a protected entity (PE 101), e.g., the identified PAL base station. In some embodiments, the PE 101 is a PAL base station, which is being moved temporarily from its primary PAL channel to a secondary channel, e.g., a GAA channel, in response to a DPA activation. Operation proceeds from step 305 to step 306.

In step 306 the first SAC determines a protection contour of the protected entity, e.g., based on received information relating to the protected entity, e.g., a received protected entity protection contour, path loss information, and/or geographic topology around the protection contour. For example, exemplary coverage contour 102 for PE 101 is shown in FIGS. 1-2, is determined in step 306. Operation proceeds from step 306 to step 308.

In step 308 the first SAC divides the protection contour into a first set of protection zones. For example, in step 308 the first SAC 202 divides the protection contour 102 into three protection zones (protection zone 1 104, protection zone 2 106 and protection zone 3 108). In some embodiments, e.g., an embodiment with a single SAC 202, operation proceeds from step 308 to step 319 (bypassing steps 310, 312, 314 and 316). In other embodiments, e.g., an embodiment in which there is a first SAC 202 and a second SAC 204, operation proceeds from step 308 to step 310.

In step 310 the first SAC communicates information indicating the determined protection contour to one or more other SACs. Operation proceeds from step 310 to step 312. In step 312 the first SAC communicates information indicating the first set of protection zones to one or more other SACs. In some embodiments, the communicated information indicating the first set of protection zones includes, e.g., information indicating the determined size, shape and location of protection zones in the first set of protection zones. Operation proceeds from step 312 to step 314. In step 314 the first SAC receives protection zone information from one or more other SACs, e.g., information indicating agreement with the communicated first set of protection zones or information indicating suggested revision(s) to the communicated set of protection zones. In some embodiments, the received protection zone information from one or more SACs includes, e.g., information indicating the size, shape and/or location or one or more protection zones recognized and known to a spectrum access controller. Operation proceeds from step 314 to step 316.

In step 316 the first SAC determines whether or not the communicated first set of protection zones should be revised. If the first SAC determines, that the communicated first set of protection zones should be revised, then operation proceeds from step 316 to step 318; otherwise operation proceeds from step 316 to step 319. In step 318 the first SAC revises the first set of protection zones (e.g., changes the shape and/or sizes of protection zones in the first set of protection zones) based on the received protection zone information from step 314. In some embodiments, revising the first set of protection zones includes, e.g., changing the shape, size, and/or location of oner or more protection zones in the first set of protection zones based on the received protection zone information. Operation proceeds from step 318 to step 312, in which the revised set of protection zones is communicated to one or more other SACs.

Returning to step 319, step 319 is performed for each interfering device, e.g., each non-PAL CBSD (GAA CBSD) being controlled by the first SAC and one or more protection zones. In step 319, the first SAC determines an interfering device's expected interference, based on a calculated path loss between the interfering device, e.g., a non-PAL CBSD, and the protection zone and its current transmit power or current effective isotropic radiated power (EIRP).

In some embodiments, determining, for each of a plurality of individual interfering devices, the individual interfering device's expected interference to at least a first protected zone is made by estimating the interference which will be made to a single point (e.g., a single location) in the first protected zone. In some such embodiments, determining, for each of a plurality of individual interfering devices, the individual interfering device's expected interference to at least a first protected zone does not include estimating interference from an individual device to multiple points (e.g., multiple locations) in the first protected zone.

In some embodiments, determining, for each of a plurality of individual interfering devices, the individual interfering device's expected interference to at a second protected zone is made by estimating the interference which will be made to a single point (e.g., a single location) in the second protected zone. In some such embodiments, determining, for each of a plurality of individual interfering devices, the individual interfering device's expected interference to a second protected zone does not include estimating interference from an individual device to multiple points (e.g., multiple locations) in the second protected zone. In some embodiments, determining, for each of a plurality of individual interfering devices, the individual interfering device's expected interference to a third protected zone is made by estimating the interference which will be made to a single point (e.g., a single location) in the third protected zone. In some such embodiments, determining, for each of a plurality of individual interfering devices, the individual interfering device's expected interference to at third protected zone does not include estimating interference from an individual device to multiple points (e.g., multiple locations) in the third protected zone.

Operation proceeds from step 319 to step 320, in which the first SAC determines an interference neighborhood around each protection zone in the first set of protection zones. For example, in step 320 the first SAC determines protection zone 1's interference neighborhood 109, protection zone 2's interference neighborhood 115 and protection zone 3's interference neighborhood 117. In some embodiments, determining an interference neighborhood, e.g., a first interference neighborhood, around a protected zone, e.g. a the first protected zone, is based on determined expected interference from one or more individual interfering devices.

In some embodiments, e.g., an embodiment with a single SAC 202, operation proceeds from step 320 via connecting node A 321 to step 334 (bypassing steps 322, 324, and 328). In other embodiments, e.g., an embodiment in which there is a first SAC 202 and a second SAC 204, operation proceeds from step 320, via connecting node A 321, to step 322.

In step 322 the first SAC communicates information indicating the determined interference neighborhood around each protection zone in the first set of protection zones to one or more other SACs. Operation proceeds from step 322 to step 324. In step 324 the first SAC receives interference neighborhood information from one or more other SACs, e.g., information indicating agreement with the communicated interference neighborhood information or information indicating suggested revision(s) to the communicated interference neighborhood information. Operation proceeds from step 324 to step 328.

In step 328 the first SAC determines whether or not one or more of the communicated interference neighborhoods should be revised. If the first SAC determines, that one or more of the interference neighborhoods should be revised, then operation proceeds from step 328 to step 330; otherwise, operation proceeds from step 328 to step 334. In step 330 the first SAC revises one or more of the interference neighborhoods based on the received interference neighborhood information from step 324. Operation proceeds from step 330, to step 322, in which the revised interference neighborhood information is communicated to one or more other SACs.

Returning to step 334, in step 334 the first SAC divides each interference neighborhood into a plurality of interference zones based on the interference distance from the protection zone to which the interference zone corresponds, and/or interference potential. For example, in step 334 the first SAC divides protection zone 1's interference neighborhood 109 (a first interference neighborhood) into inner interference zone 110 and outer interference zone 112; the first SAC divides protection zone 2's interference neighborhood 115 (a second interference neighborhood) into inner interference zone 114 and outer interference zone 116; and the first SAC divides protection zone 3's interference neighborhood 117 (a third interference neighborhood) into inner interference zone 118 and outer interference zone 120.

In some embodiments dividing the first interference neighborhood into a first plurality of interference zones includes dividing the first interference neighborhood based on: i) interfering devices in different areas of the first neighborhood, ii) expected interference from interfering devices in different areas of the first neighborhood and/or ii) pathloss information based on the topology of different areas of the first neighborhood. In some embodiments dividing the second interference neighborhood into a second plurality of interference zones includes dividing the second interference neighborhood based on: i) interfering devices in different areas of the second neighborhood, ii) expected interference from interfering devices in different areas of the second neighborhood and/or ii) pathloss information based on the topology of different areas of the second neighborhood. In some embodiments dividing the third interference neighborhood into a third plurality of interference zones includes dividing the third interference neighborhood based on: i) interfering devices in different areas of the third neighborhood, ii) expected interference from interfering devices in different areas of the third neighborhood and/or ii) pathloss information based on the topology of different areas of the third neighborhood.

In some embodiments, dividing the first interference neighborhood into a first plurality of interference zones includes dividing the first interference neighborhood into zones corresponding to different path losses to the protected device, said first interference zone having a lower path loss to the first protected device than said second interference zone. In some embodiments, dividing the second interference neighborhood into a second plurality of interference zones includes dividing the second interference neighborhood into zones corresponding to different path losses to the protected device, said first interference zone having a lower path loss to the first protected device than said second interference zone. In some embodiments, dividing the third interference neighborhood into a third plurality of interference zones includes dividing the third interference neighborhood into zones corresponding to different path losses to the protected device, said first interference zone having a lower path loss to the first protected device than said second interference zone.

In some embodiments, dividing the first interference neighborhood into a first plurality of interference zones, includes dividing the first interference neighborhood to include fewer interfering devices in said first interference zone (e.g., which has lower path loss) than the number of interfering devices included in said second interfering zone (e.g., include more devices in second zone since individual interference devices in that zone are less likely to cause interference due to the greater path loss to the protected device for devices in the second zone than the first interference zone). In some embodiments, dividing the second interference neighborhood into a second plurality of interference zones, includes dividing the second interference neighborhood to include fewer interfering devices in said first interference zone (e.g., which has lower path loss) than the number of interfering devices included in said second interfering zone (e.g., include more devices in second zone since individual interference devices in that zone are less likely to cause interference due to the greater path loss to the protected device for devices in the second zone than the first interference zone). In some embodiments, dividing the third interference neighborhood into a third plurality of interference zones, includes dividing the third interference neighborhood to include fewer interfering devices in said first interference zone (e.g., which has lower path loss) than the number of interfering devices included in said second interfering zone (e.g., include more devices in second zone since individual interference devices in that zone are less likely to cause interference due to the greater path loss to the protected device for devices in the second zone than the first interference zone).

In some embodiments, e.g., an embodiment with a single SAC 202, operation proceeds from step 334 to step 346 (bypassing steps 336, 338, 340) via connecting node B 344. In other embodiments, e.g., an embodiment in which there is a first SAC 202 and a second SAC 204, operation proceeds from step 334 to step 336.

In step 336 the first SAC communicates information indicating the determined plurality of interference zones, corresponding to each interference neighborhood, to one or more other SACs. In some embodiments, step 336 includes communicating information indicating the determined size, shape and/or location of one or more interference zones. Operation proceeds from step 336 to step 338. In step 338 the first SAC receives interference zone information from one or more other SACs, e.g. information indicating agreement with the communicated interference zone information or information indicating suggested revision(s) to the communicated interference zones or information which can be used to revise interference zones, e.g. information indicating a number of interfering devices located in each interference zone, location information for interfering device(s), and/or antenna directional information for interfering device(s). In some embodiments, the received interference zone information from one or more other SACs includes, e.g., information indicating the size, shape and/or location of one or more interference zones determined by one or more of the other SACs. Operation proceeds from step 338 to step 340.

In step 340 the first SAC determines whether or not one or more of the interference zones should be revised. If the first SAC determines, that one or more of the interference zones should be revised, then operation proceeds from step 340 to step 342; otherwise, operation proceeds from step 340, via connecting node B 344 to step 346. In step 342 the first SAC revises one or more of the interference zones based on the received interference zone information from step 338. In some embodiments, revising one or more of the interference zone based on the received interference zone information includes changing the size, shape and/or location of one or more interference zones. Operation proceeds from step 342 to step 336, in which the revised interference zone information is communicated to one or more other SACs.

Returning to step 346, in step 346 the first SAC determines if the number of SACs is greater than 1. If the number of SACs is one, then operation proceeds from step 346 to step 348, in which the first SAC determines that the first SAC is allocated the full (received or specified) overall interference quota. Operation proceeds from step 348 to step 360.

Alternatively, in step 346, if the number of SACs is determined to be greater than 1, then operation proceeds from step 346 to step 350. In step 350 the first SAC determines an interference quota for each SAC, e.g., allocates an interference quota, e.g., an equal fractional interference quota, to each SAC based on a received or specified overall interference quota. Operation proceeds from step 350 to step 352.

In step 352 the first SAC communicates a determined interference quota for each particular other SAC, e.g., the second SAC, to the other particular SAC, e.g., the second SAC. Operation proceeds from step 352 to step 354.

In step 354 the first SAC received interference quota response information from the one or more other SACs (e.g., from at least one SAC), e.g., information indicating agreement with the communicated allocated interference quota or information indicating suggested revision(s) to the communicated interference quota or information which can be used to revise the allocated interference quotas, e.g., information indicating a number of interfering devices. Operation proceeds from step 354 to step 356.

In step 356 the first SAC determines if interference quotas to SACs should be revised. If the first SAC determines that interference quotas to SACs should be revised, then operation proceeds from step 356 to step 358. In step 358 the first SAC revises interference quotas based on the received interference quota response information from one or more SACs. Operation proceeds from step 358 to step 352, in which the first SAC communicates the revised interference quota information to the other SACs, e.g., to the second SAC.

Alternatively, if the first SAC determined in step 356 that the interference quotas allocated to the SACs should not be revised, then operation proceeds from step 356 to step 360.

In step 360 the first SAC determines, e.g., allocates, an interference quota for each interference zone based on the interference quota allocated to the first SAC, a distance from the interference zone to its corresponding protection zone or the interference zone's mean/aggregate interference potential. (Interference quota is to be divided equally among the interfering devices in the interference zone.) In some embodiments, allocating an interference quota to each of the interference zones in the first plurality of interference zones is performed in a non-iterative manner with the allocation being made and used to limit the amount of interference to the protection zone. In some embodiments, allocating an interference quota to each of the interference zones in the first plurality of interference zones is performed without taking into consideration unused portions of allocated interference quotas that are allocated to some interference zones (e.g., other interference zones in the first plurality of interference zones which may not or do not use their full quota).

In some embodiments, allocating an interference quota to each of the interference zones in the first plurality of interference zones includes allocating a larger interference quota to the second interference zone than the first interference zone. Operation proceeds from step 360 to step 362.

In step 362, the first SAC determines, e.g., allocates, an interference quota for each interfering device (e.g., each non-PAL CBSD (GAA CBSD) being controlled by the first SAC) in each interfering zone. Step 362 includes step 364, in which the first SAC, for each interfering zone, divides its determined (e.g., allocated) interference quota by the number of devices to determine a per device interference quota for the interference zone.

For example, in step 362 the first SAC determines an interference quota for each interfering device in the first interference zone being controlled by the first SAC, e.g., by dividing, in step 364 the interference quota for the first interference zone by the number of interfering devices in the first interference zone being controlled by the first SAC; and determines in step 362 an interference quota for each interfering device in the second interference zone being controlled by the first SAC, e.g., by dividing (364) the interference quota for the second interference zone by the number of interfering devices in the second interference zone being controlled by the first SAC; and determines in step 362 an interference quota for each interfering device in the third interference zone being controlled by the first SAC, e.g., by dividing (364) the interference quota for the third interference zone by the number of interfering devices in the third interference zone being controlled by the first SAC. Operation proceeds from step 362, via connecting node C 366, to step 368.

In step 368 the first SAC is operated to communicate a control message to one or more interfering devices, e.g., non-PAL CBSDs (GAA CBSDs), in an interference zone to limit the amount of interference from the interference zone to stay within the interference quota allocated to the interference zone. Step 368 includes steps 370, 372, 374, 380, 384 and 386. For each interfering device (e.g., each non-PAL CBSD (GAA CBSD) being controlled by the first SAC in an interference zone, operation proceeds to step 370. In step 370 the first SAC determines if the level of interference from the interfering device is below its interference quota. If the determination is that the level of interference for the interfering device is below its interference quota, then operation proceeds from step 370 to step 372; otherwise, operation proceeds from step 370 to step 380.

In step 372 the first SAC determines to grant the interfering device (e.g., non-PAL CBSD) channel access. Operation proceeds from step 372 to step 374. In step 374 the first SAC sends a message to the interfering device (e.g., non-PAL CBSD) granting the interfering device channel access. Step 374 includes step 376 or step 378. In step 376 the first SAC include information indicating that the interfering device may continue operating at its current transmit power or EIRP. In step 378 the SAC includes information indicating a transmit power or EIRP to be used by the interfering device.

Returning to step 380, in step 380 the first SAC determines to command the interfering device (e.g., non-PAL CBSD) to power down to meet the quota or determines to command the interfering device to cease channel access. Step 380 includes step 382, in which the first SAC determines a transmit power or an EIRP for the interfering device to satisfy its individual interference quota. Operation proceeds from step 380 to step 384 or step 386. In step 384 the first SAC sends a message to the interfering device (e.g., non-PAL CBSD) granting the interfering device channel access. Step 384 includes step 388 of step 390. In step 388 the first SAC includes in the message information indicating an amount to power down form its current transmit power or current EIRP. In step 390 the first SAC includes in the message information includes a new transmit power or new EIRP to be used.

Returning to step 386, in step 386 the first SAC sends a message to the interfering device (e.g., non-PAL CBSD) commanding the interfering device to cease channel access.

In some embodiments, said steps of: determining (320) a first interference neighborhood around the first protected zone; dividing (334) the first interference neighborhood into a first plurality of interference zones; and allocating (360) an interference quota to each of the interference zones in the first plurality of interference zones is performed in response to the reassignment of the protected device to use not PAL spectrum (GAA channel spectrum). In some embodiments, said reassignment is for a short term period (e.g., several minutes or a few hours but normally less than a day). In some embodiments, the interfering devices and the protected device use non-PAL channel spectrum (GAA channel spectrum) following said reassignment of the protected device. In some embodiments, the interfering devices are GAA CBSDs (Citizens Broadband Radio Service Devices).

Figure 4:
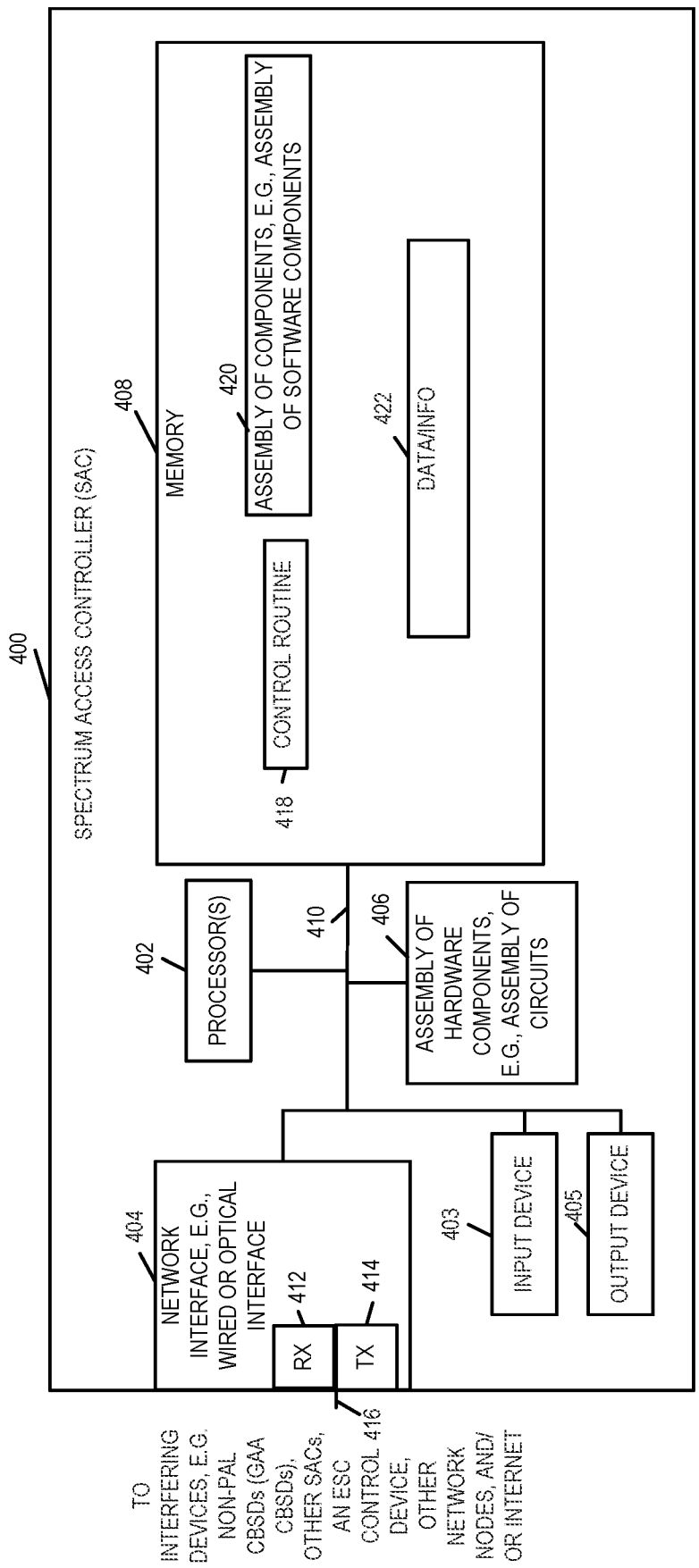
FIG. 4 is a drawing of an exemplary spectrum access controller (SAC) in accordance with an exemplary embodiment.

FIG. 4 is a drawing of an exemplary spectrum access controller (SAC) 400 in accordance with an exemplary embodiment. SAC 400 is, e.g., any of the SACs (SAC 1 201, SAC 2 204 of system 200 of FIG. 2 and/or a SAC implementing steps of the exemplary method of flowchart 300 of FIG. 3. In some embodiments, the SAC 400 is a part of a SAS, e.g. the SAC 400 is a component of a spectrum access system or a component of a spectrum access server. In some embodiments, the SAC 400 is a SAS.

Exemplary SAC 400 includes a processor 402, e.g., a CPU, a network interface 404, an input device 403, e.g., a keyboard and/or mouse, an output device 405, e.g., display, a network interface 404, e.g. a wired or optical interface, an assembly of hardware components 406, e.g. an assembly of circuits, and memory 408 coupled together via a bus 410 over which the various elements may interchange data and information. Network interface 404 includes a receiver 412 and a transmitter 414 coupled to connector 416, via which the SAC 400 receives and sends signals to interfering devices, e.g., a set of non-PAL CBSDs (GAA CBSDs) corresponding to a service provider, other SACs, a ESC control device, e.g., ESC control device 206, other network nodes and/or the Internet. Memory 408 includes a control routine 418 an assembly of components, e.g., an assembly of software components, and data/information 422. Control routine 418 controls the SAC 400 to perform various standard operations, e.g., access memory, load memory, control an I/O device, operate a receiver or transmitter, etc. Assembly of components 420, e.g., an assembly of software components, e.g., routines, subroutines, software modules, software applications, etc., include instructions, which when executed by processor 402 cause the SAC 500 to implement steps of a method, e.g., steps of a method of low complexity spectrum sharing, e.g., as shown or described with respect to flowchart 300 of FIG. 3.

Figure 5:
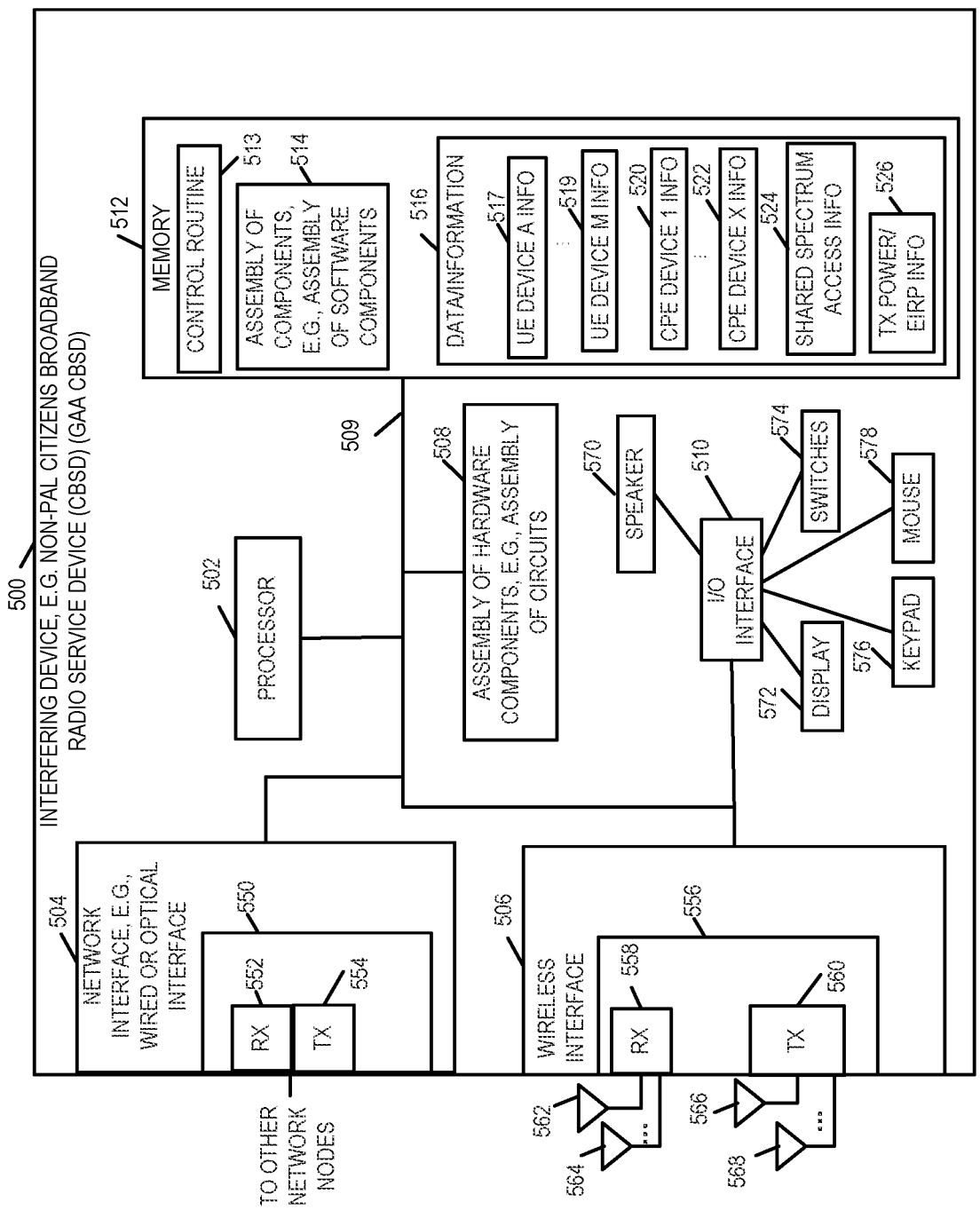
FIG. 5 is a drawing of an exemplary interfering device, e.g., a non-PAL CBSD, in accordance with an exemplary embodiment.

FIG. 5 is a drawing of an exemplary interfering device 500, e.g., a non-PAL CBSD (GAA CBSD), in accordance with an exemplary embodiment. Exemplary interfering device 500 is, e.g., any of the interfering devices, e.g. non-PAL CBSD (GAA CBSD) 208, 210, 212, 214, 216, 218, 220, 222, 224, 226, 228, 230, 232, 234, 236, 238, 240, 242, 244, 246, 248, 250, 252, 252, 254, 256, 258, 260, 262, 264, 266, 268, 270, 272, 274, 276, 278, 280, 282, 284, 286, 288, 290, 292 and 293, of system 200 of FIG. 2.

Interfering device 500 includes a processor 502, e.g., a CPU, a network interface 504, e.g., a wired or optical interface, a wireless interface 506, an assembly of hardware components 508, e.g., an assembly of circuits, an I/O interface 510 and memory 512 coupled together via bus 509 over which the various elements may interchange data and information. Network interface 504 includes a receiver (RX) 552 and a transmitter (TX) 554 coupled to a connector 555, via which the interfering device 500 receives/sends signals and messages to other network nodes. In some embodiment RX 552 and TX 554 are included as part of a transceiver, e.g., a transceiver chip. Interfering device 500 receives via RX 552 messages from an SAC, e.g., a message instructing the device 500 that the device 500 has been granted channel access and further including information indicating that the device 500 may continue operating at its current transmit power of current EIRP, a message instructing the device 500 that the device 500 has been granted channel access and further including information indicating an amount of power down from its current transmit power or current EIRP or information indicating a new transmit power or new EIRP to be used, or a message commanding the device 500 to cease channel access. Device 500 transmits via TX 524, messages to a SAS, e.g., a message indicating its current transmit power level and/or current EIRP.

Wireless interface 506 includes a wireless receiver 558 coupled to a plurality of receive antennas or antenna elements (562, 564), via which the device 500 receives wireless signals from UEs. Wireless interface 506 further includes a plurality of transmit antenna or antenna elements (566, 568) via which the device 500 transmits wireless signal to UEs. In some embodiments, the wireless RX 558 and wireless transmitter 560 are part of a transceiver 556, e.g., a transceiver chip. In some embodiments, one or more of the antennas or antenna elements are used for both reception and transmission. In some embodiments, the wireless interface supports beam forming and/or uses directional antennas. The wireless interface 504 supports communications on a spectrum which may be, and sometimes is shared. In some embodiments access and/or allocation to the shared spectrum is managed by a SAC, which is coupled to the device 500.

Device 500 further includes a plurality of I/O devices (speaker 570, display 572, e.g., a touch screen display, switches 574, keypad and/or keyboard 576, a mouse 578) coupled to I/O interface 510, which couples the various I/O devices to bus 509 and other elements of the device 500.

Memory 512 includes a control routine 513, an assembly of components 514, e.g., and assembly of software components, and data/information 516. Control routine 513 controls the device 500 to perform various standard operations, e.g., access memory, load memory, control an I/O device, operate a receiver or transmitter, etc. Assembly of components 514, e.g., an assembly of software components, e.g., routines, subroutines, software modules, software applications, etc., include instructions, which when executed by processor 502 cause the device 500 to implement steps of a method, e.g., steps relating to implementing a method of low complexity spectrum shared, e.g., as described with respect to flowchart 300 of FIG. 3.

Data/information 516 includes information corresponding to a plurality of UE devices (UE device A information 517, . . . UE device M information 519) and information corresponding to a plurality of CPE devices (CPE device 1 information 520, . . . , CPE device X information 522), shared spectrum access information 524 indicating whether or not the device 500 is allowed to used shared spectrum, and TX power level information 526 indicating the level of transmit power or level of EISP to be used by the device 500 when allowed to used the shared spectrum.

Figure 6A:
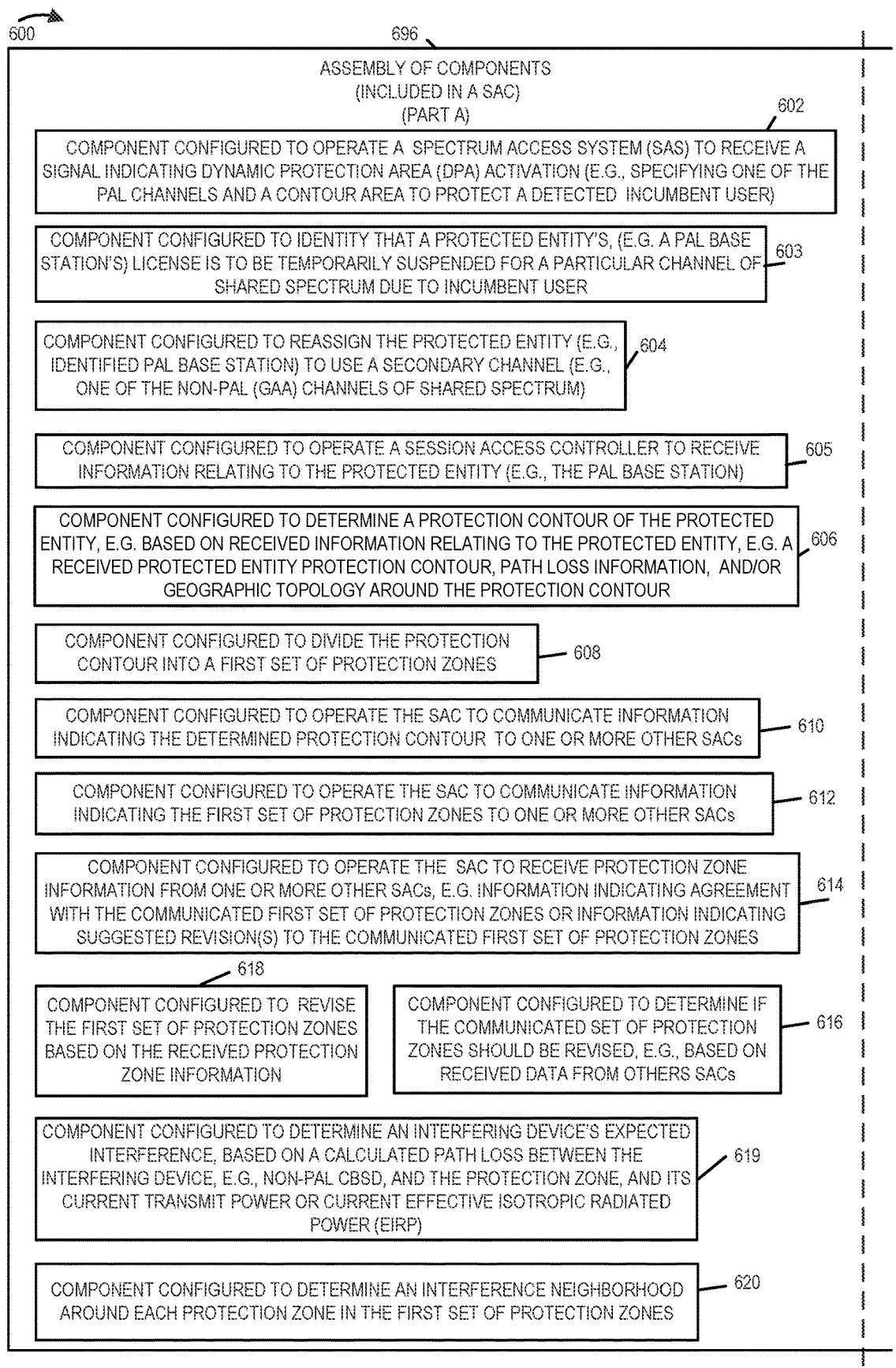
FIG. 6A is a drawing of a first part of an exemplary assembly of components which may be included in a spectrum access controller in accordance with an exemplary embodiment.
Figure 6B:
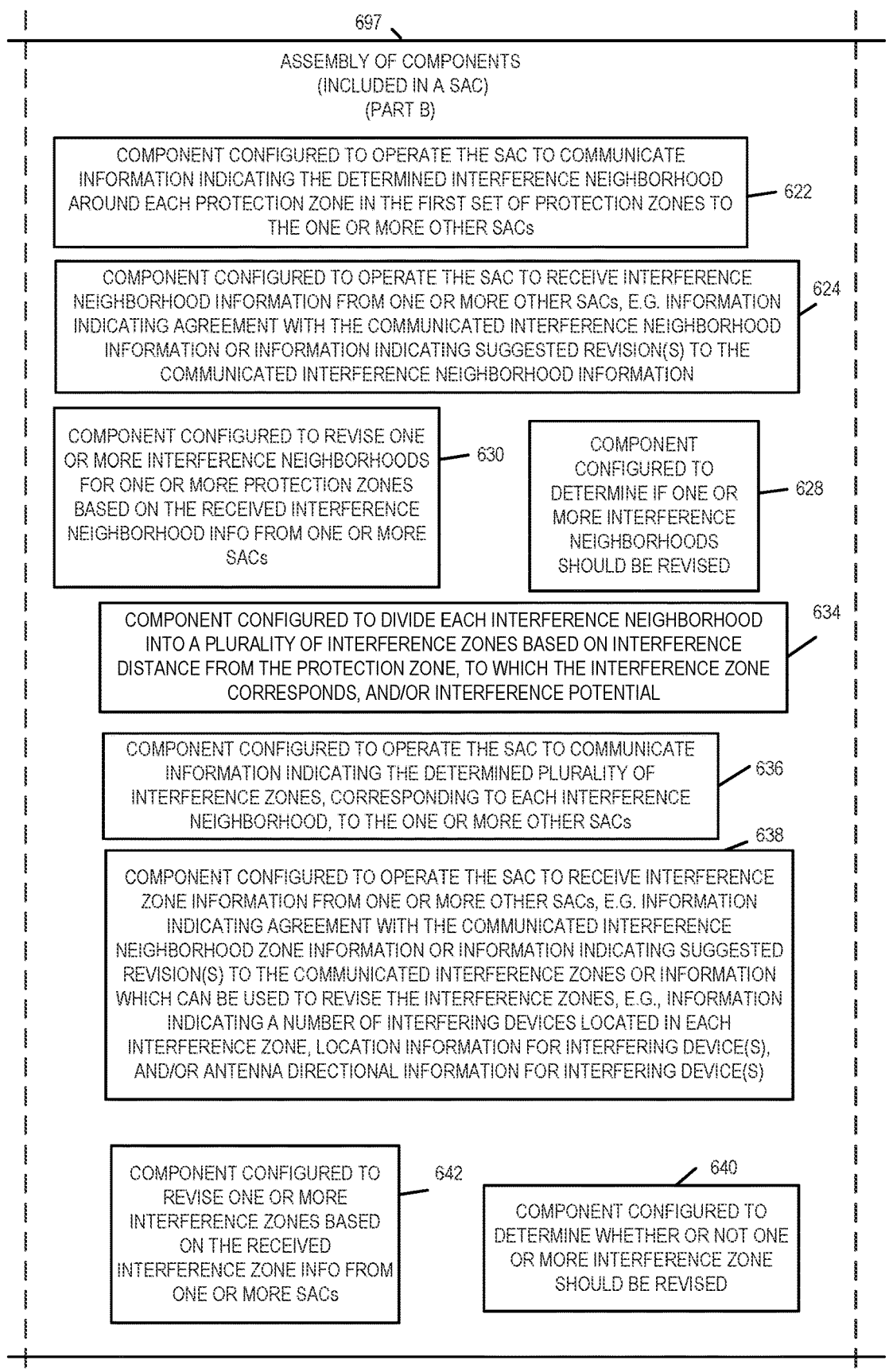
FIG. 6B is a drawing of a second part of an exemplary assembly of components which may be included in a spectrum access controller in accordance with an exemplary embodiment.
Figure 6C:
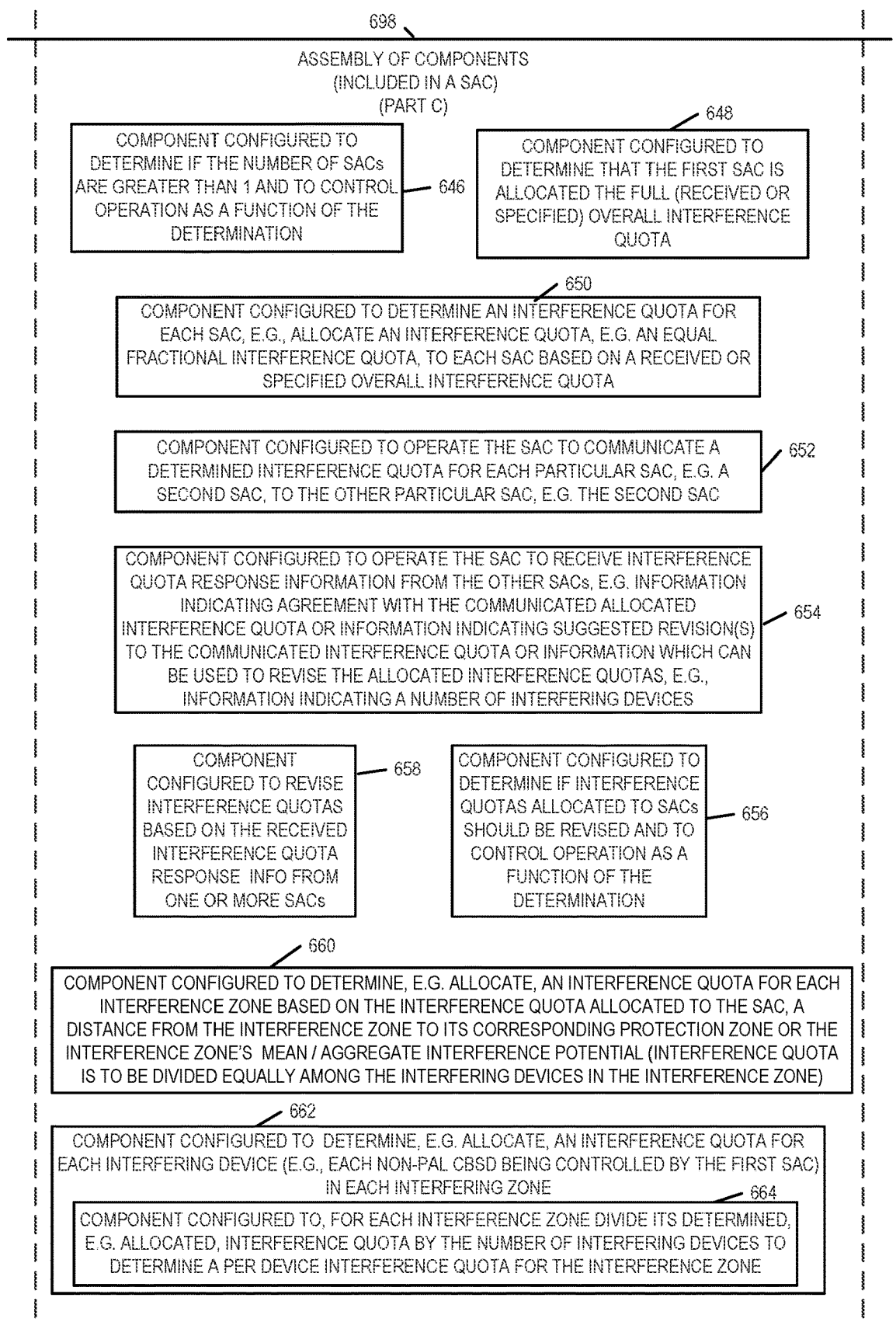
FIG. 6C is a drawing of a third part of an exemplary assembly of components which may be included in a spectrum access controller in accordance with an exemplary embodiment.
Figures 6, 6D:
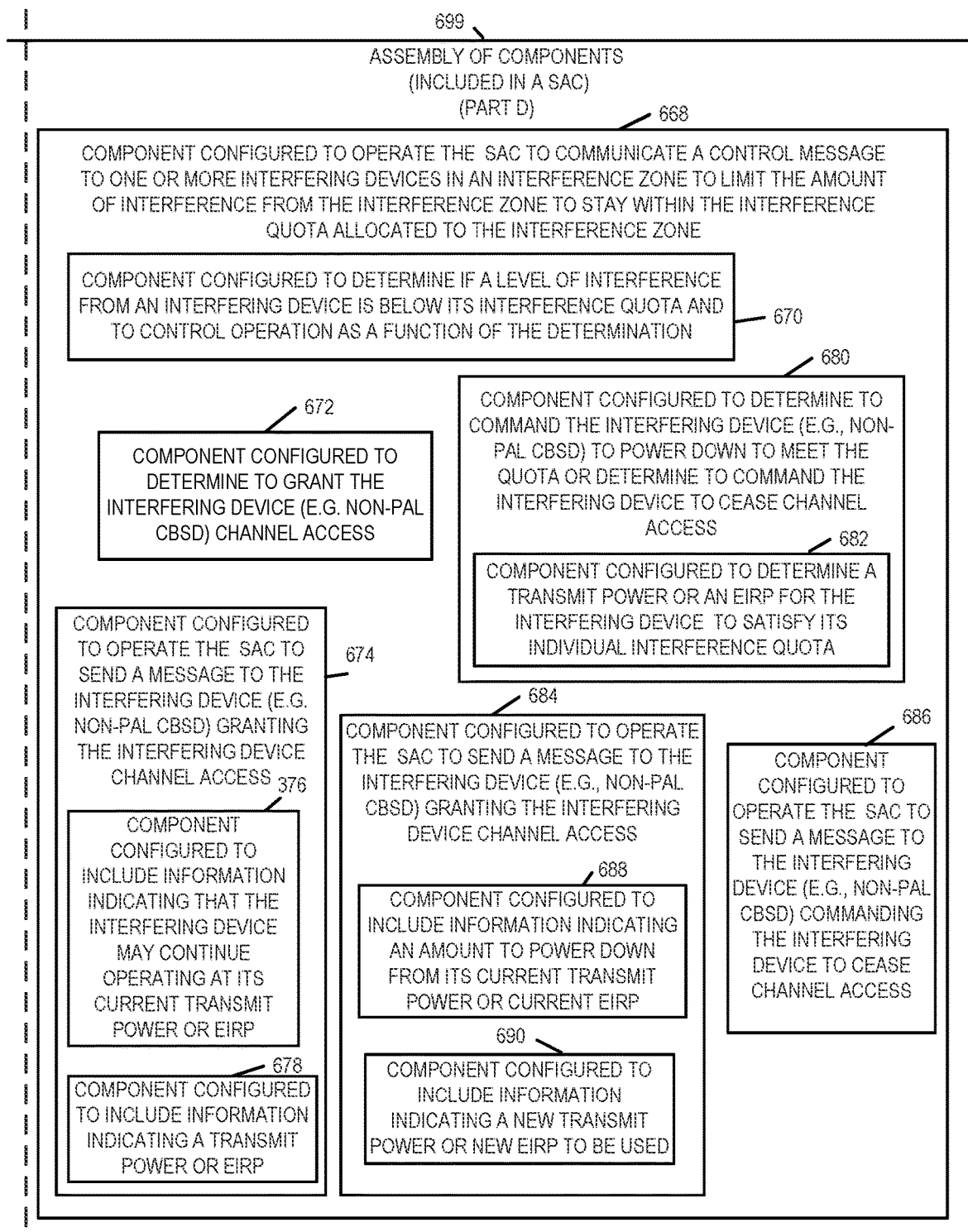
FIG. 6D is a drawing of a fourth part of an exemplary assembly of components which may be included in a spectrum access controller in accordance with an exemplary embodiment.
FIG. 6 comprises the combination of FIG. 6A, FIG. 6B, FIG. 6C and FIG. 6D.

FIG. 6, comprising the combination of FIG. 6A, FIG. 6B, FIG. 6C and FIG. 6D, is a drawing of an exemplary assembly of components 600 including the combination of Part A 696, Part B 697, Part C 698 and Part D 699, which may be included in a spectrum access controller (SAC), e.g. SAC 202 of system 200 of FIG. 2, SAC 204 of system 200 FIG. 2, SAC 400 of FIG. 4, and/or a SAC implementing steps of an exemplary method, e.g. steps of the method of flowchart 300 of FIG. 3 in accordance with an exemplary embodiment.

The components in the assembly of components 600 can, and in some embodiments are, implemented fully in hardware within a processor, e.g., processor 402, e.g., as individual circuits. The components in the assembly of components 600 can, and in some embodiments are, implemented fully in hardware within the assembly of hardware components 406, e.g., as individual circuits corresponding to the different components. In other embodiments some of the components are implemented, e.g., as circuits, within processor 402 with other components being implemented, e.g., as circuits within assembly of components 406, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 408 of the spectrum access controller 400, with the components controlling operation of spectrum access controller 400 to implement the functions corresponding to the components when the components are executed by a processor e.g., processor 402. In some such embodiments, the assembly of components 600 is included in the memory 408 as part of an assembly of software components 420. In still other embodiments, various components in assembly of components 600 are implemented as a combination of hardware and software, e.g., with another circuit external to the processor providing input to the processor which then under software control operates to perform a portion of a component's function.

When implemented in software the components include code, which when executed by a processor, e.g., processor 402, configure the processor to implement the function corresponding to the component. In embodiments where the assembly of components 600 is stored in the memory 408, the memory 408 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the spectrum access controller 400 or elements therein such as the processor 402, to perform the functions of corresponding steps illustrated and/or described in the method of one or more of the flowcharts, signaling diagrams and/or described with respect to any of the Figures. Thus, the assembly of components 600 includes various components that perform functions of corresponding one or more described and/or illustrated steps of an exemplary method, e.g., steps of the method of flowchart 300 of FIG. 3.

Assembly of components 600 includes a component 602 configured to operate a SAS to receive a signal indicating dynamic protection area (DPA) activation, e.g. specifying one of the PAL channels and a contour area to protect a detected incumbent user, a component 603 configured to identify that a protected entity's (e.g. a PAL base station's) license is to be temporarily suspended for a particular channel of shared spectrum due to incumbent user, and a component 604 configured to reassign (for a temporary reassignment) the identified protected entity (e.g. the identified PAL base station which is impacted by the DPA activation) to use a secondary channel (e.g. one of the non-PAL (GAA) channels of shared spectrum).

Assembly of components 600 further includes a component 605 configured to operate a session access controller to receive information related to the protected entity (e.g. PAL base station), a component 606 configured to determine a protection contour of the protected entity, e.g., based on received information relating to the protected entity, e.g. a received protected entity protection contour, path loss information, and/or geographic topology around the protection contour, a component 608 configured to divide the protection contour into a first set of protection zones, a component 610 configured to operate the SAC to communicate information indicating the determined protection contour to one or more other SACs, a component 612 configured to operate the SAC to communicate information indicating the first set of protection zones to one or more other SACs, and a component 614 configured to operate the SAC to receive protection zone information from one or more other SACs e.g. information indicating agreement with the communicated first set of protection zones or information indicating suggested revision(s) to the communicated first set of protection zones.

Assembly of components 600 further includes a component 616 configured to determine if the communicated set of protection zones should be revised, e.g. based on received data from other SACs, and to control operation as a function of the determination, a component 618 configured to revise the first set of protection zones based on received protection zone information from one or more other SACs, a component 619 configured to determine an interfering device's expected interference, based on a calculated path loss between the interfering device, e.g. non-PAL CBSD, and the protection zone, and its current transmit power or current effective isotropic radiated power (EIRP), and a component 620 configured to determine an interference neighborhood around each protection zone in the first set of protection zones.

Assembly of components 600 further includes a component 622 configued to operate the SAC to communicate information indicating the determined interference neighborhood around each protection zone in the first set of protection zones to one or more other SACs, a component 624 configured to operate the SAC to receive interference neighborhood information from one or more other SACs, e.g. information indicating agreement with the communicated interference neighborhood information or information indicating suggesting revision(s) to the communicated interference neighborhood information, a component 628 configured to determine if one or more interference neighborhoods should be revised based on the received interference neighborhood information from one or more other SACs and to control operation as a function of the determination, a component 630 configured to revise one or more interference neighborhoods for one or more protection zones based on the received interference neighborhood information from one or more SACs, a component 634 configured to divide each interference neighborhood into a plurality of interference zones based on interference distance from the protection zone, to which the interference zone corresponds, and/or interference potential, and a component 636 configured to operate the SAC to communicate information indicating the determined plurality of interference zones, corresponding to each interference neighborhood, to one or more other SACs.

Assembly of components 600 further includes a component 638 configured to operate the SAC to receive interference zone information for one or more other SACS, e.g. information indicating agreement with the communicated interference neighborhood zone information or information indicated suggested revision(s) to the communicated interference neighborhood zones or information which can be used to revise the interference zones, e.g. information indicating a number of interfering devices located in each interference zone, location information for interfering device(s), and/or antenna directional information for interfering device(s), a component 640 configured to determine whether or not one or more interference zones should be revised based on the received interference zone information from one or more other SACs and to control operation as a function of the determination, and a component 642 configured to revise one or more interference zones based on the received interference zone information from one or more SACs.

Assembly of component 600 further includes a component 646 configured to determine if the number of SACs is greater than one and to control operation as a function of the determination, a component 648 configured to determine that the SAC is allocated the full (received or specified) overall interference quota, in response to a determination that there is only one SAC managing the interference for the protected entity, e.g. the one SAC is controlling the full set of interfering devices, e.g. full set of non-PAL CBSDs, which are potential interferes to the protected entity.

Assembly of components 600 further includes a component 650 configured to determine an interference quota for each SAC, e.g. allocate an interference quota, e.g. allocate an equal fractional interference quota, to each SAC based on the received or specified overall interference quotas and the total number or SAC involved in the interference management for the protected entity, a component 652 configured to operate the SAC to communicate a determine interference quota for each particular SAC, e.g. a second SAC, to the other particular SAC, e.g. the second SAC, and a component 654 configured to operate the SAC to receive interference quota response information from the other SACs, e.g. information indicating agreement with the communicated allocated interference quota or information indicating suggested revision(s) to the communicated interference quota or information which can be used to revise the allocated interference quotas, e.g. information indicating a number of interfering devices, a component 656 configured to determine if interference quotas allocated to SACs should be revised based on the received interference quota response information and to control operation as a function of the determination, a component 660 configured to determine, e.g. allocate, an interference quota for each interference zone based on the interference quota allocated (e.g. self-allocated) to the SAC, a distance from the interference zone to its corresponding protection zone or the interference zone's mean/aggregate interference potential (interference quota is to be divided equally among the interfering devices in the interference zone), and a component 664 configured to determine, e.g. allocate, an interference quota for each interfering device (e.g., each non-PAL CBSD being controlled by the SAC) in each interference zone. Component 662 includes a component 664 configured to, for each interference zone, divide its determined, e.g., allocated interference quota by the number of interfering devices to determine a per device interference quota for the interference zone.

Assembly of components 600 further includes a component 688 configured to operate the SAC to communicate a control message to one or more interfering devise in an interference zone to limit the amount of interference from the interference zone to stay with the interference quota allocated to the interference zone. Component 688 includes a component 670 configured to determine if a level of interference from an interfering device is below its interference quota and to control operation as a function of the determination, a component 672 configured to determine to grant the interfering device, e.g. non-PAL CBSD, channel access in response to a determination that the level of interference from the interfering device is expected to be below is interference quota, and a component 680 configured to determine to command the interfering device, e.g. non-PAL CBSD, to power down to meet its interference quota or determine to command the interfering device to cease channel access, e.g., in response to a determination that the expected interference from the interfering device is above its interference quota. Component 680 includes a component 682 configured to determine a transmit power or EIRP for the interfering device to use to satisfy its individual interference quota.

Component 688 further a component 674 configured to operate the SAC to send a message to the interfering device, e.g., non-PAL CBSD, granting the interfering device channel access, e.g., in response to the determination of component 672. Component 674 includes a component 674 configured to include in the message information indicating that the interfering device may continue operating at its current power or current EIRP and a component 678 configure to include in the message information indicating a transmit power or EIRP to be used by the interfering device.

Component 668 further includes a component 684 configured to operate the SAC to send a message to the interfering device (e.g., non-PAL CBSD) granting the interfering device channel access, e.g., in response to a determination of step 680 to command the interfering device to power down to meet its quota. Component 684 includes a component 688 configured to include in said message information indicating an amount to power down from its current transmit power or current EIRP, and a component 690 configured to include in said message information indicating a new transmit power level or new EIRP to be used by the interfering device.

Component 668 further includes component 686 configured to operate the SAC to send a message to the interfering device (e.g., non-PAL CBSD) commanding the interfering devi e to cease channel access, e.g., in response to a determination by component 680 to command the interfering device to cease channel access.

Various aspects and/or features of some embodiments of the present invention are further described below. The invention provides a low complexity method for a spectrum access controller to protect a protected entity. In one exemplary embodiment, a spectrum access controller (SAC) divides the coverage contour of the entity to be protected into geospatial zones called protection zones. Each protection zone is protected against interference located within a certain distance from the protection zone called interference neighborhood. Each interference neighborhood id divided into interference zones based on their interference potential or distance from the protection zone. Potential interferes are grouped based on their location in the interference zones or interference potential. The interference quota for the protection zone is divided equally among the potential interferes in each group/zone. The quota may be divided unequally among groups/zones, e.g., based on their overall interference potential or proximity to the protection zone, or number of interferes. Each interfere is assigned a transmit power or EIRP to meet its individual interference quota. Assignments for an interfere that affects multiple protection zones are combined over the protection zones, e.g., by choosing the most conservative assignment.

Various invention benefits will now be discussed. The invention provides a low complexity method for spectrum sharing. Pathloss, in some embodiments, is only be calculated between an interfering user and a protection zone. Aggregate interference, in some embodiments, is only be calculated per (protection zone, interference zone). The process, in some embodiments, is not iterative.

With low complexity, a spectrum access controller can enable spectrum sharing in a quick fashion. As the number of protection zones and interference zones increase, the method converges toward optimum protection. Therefore, complexity can be traded off with speed to protection by changing the number of protection zones and interference zones.

A first exemplary embodiment in accordance with the present invention, in which there is a single SAC, will now be described. The SAC determines protection contour of the protected entity. The SAC divides the protection contour into protection zones. The SAC determines an interference neighborhood around each protection zone. The SAC divides each interference neighborhood into interference zones based on interferer distance from protection zone or interference potential. The SAC determine an interference quota for each interference zone based on its distance or the mean/aggregate interference potential. Interference quota is divided equally among the interferes in the interference zone. For each interfere in an interference zone, the SAC determines whether its interference is below its interference quota. Interferes with interference below the quota are granted channel access by the SAC. Interferes with interference above the quota are required to power down to meet the quota or asked to cease channel access.

A second exemplary embodiment in accordance with the present invention, in which there are multiple SAC entities which manage user devices of their clients, will now be described. The SAC entities coordinate among themselves information about the protected and interfering devices, the determination of the protection and interference zones, the determination of interference quotas and the determination of channel access and power grants for all of the devices jointly.

In a third exemplary embodiment in accordance with the present invention, the multiple SAC entities coordinate among themselves information about the protected entities. However, the determination of channel access and power grants is done more or less independently for the user devices managed by them. In the third embodiment, SAC entities may exchange some information about the user devices such as their interference potential or quota with other SAC entities.

NUMBERED LIST OF EXEMPLARY METHOD EMBODIMENTS

Method Embodiment 1. A method of operating a first spectrum access controller (SAC), the method comprising: determining (306) a protection contour of a protected entity; dividing (308) the protection contour into a first set of protection zones, said first set of protected zones including at least a first protected zone and a second protected zone; determining (320) a first interference neighborhood around the first protected zone; dividing (334) the first interference neighborhood into a first plurality of interference zones, said first plurality of interference zones including at least a first interference zone and a second interference zone; allocating (360) an interference quota to each of the interference zones in the first plurality of interference zones, said allocating including allocating a first interference quota to the first interference zone and a second interference quota to the second interference zone; and communicating (368) control messages to one or more interfering devices in the first interference zone to limit the amount of interference from the first interference zone to stay within said first interference quota.

Method Embodiment 1A. The method of Method Embodiment 1, wherein allocating (360) an interference quota to each of the interference zones in the first plurality of interference zones is performed in a non-iterative manner with the allocation being made and used to limit the amount of interference to the protection zone.

Method Embodiment 1AB. The method of Method Embodiment 1, wherein allocating (360) of interference quota to each of the interference zones in the first plurality of interference zones is performed without taking into consideration unused portions of allocated interference quotas that are allocated to some interference zones (e.g., other interference zones in the first plurality of interference zones which may not or do not use their full quota).

Method Embodiment 1B. The method of Method Embodiment 1, further comprising: receiving (314) protection zone information from one or more other spectrum access controllers (e.g., information indicating the size, shape and location of one or more protection zones recognized and known to a spectrum access controller); and revising (318) the first set of protection zones (e.g., change the shape, size and/or location of one or more protection zones in the first set of protection zones) based on the received protection zone information.

Method Embodiment 1BA. The method of Method Embodiment 1B, further comprising: communicating (312) first protection zone information (e.g. indicating the determined size, shape and location of protection zones in said first set of protection zones) to said one or more other spectrum access controllers prior to receiving (314) said protection zone information from one or more other spectrum access controllers.

Method Embodiment 1C. The method of Method Embodiment 1, further comprising: receiving (338) interference zone information from one or more other spectrum access controllers (e.g., information indicating the size, shape and/or location of one or more interference zones determined by one or more of the other spectrum access controllers); and revising (342) one or more interference zones based on the received interference sone information (e.g., change the size, shape and/or location of one or more interference zones) prior to performing said step of allocating (360) an interference quota to each of the interference zones in the first plurality of interference zones.

Method Embodiment 1D. The method of Method Embodiment 1C, further comprising: communicating (336) first interference zone information (e.g. indicating the determined size, shape and location of interference zones in said first set of interference zones) to said one or more other spectrum access controllers prior to receiving (338) said interference zone information from the one or more other spectrum access controllers.

Method Embodiment 1E. The method of Method Embodiment 1, further comprising: receiving interference quota information (354) from one or more other spectrum access controllers (e.g., from at least one spectrum access controller); and revising (358) the interference quotas allocated to one or more of the interference zones in the first plurality of interference zones prior to communicating (368) control messages to one or more interfering devices in the first interference zone.

Method Embodiment 1F. The method of Method Embodiment 1E, further comprising: communicating (352) determined interference quotas for interference zones in said first set of interference zones to one or more other spectrum access controllers prior to receiving said interference quota information form the one or more other spectrum access controllers.

Method Embodiment 2. The method of Method Embodiment 1, further comprising: determining (319), for each of a plurality of individual interfering devices, the individual interfering device's expected interference to at least the first protected zone; and wherein determining (320) a first interference neighborhood around the first protected zone is based on determined expected interference from one or more individual interfering devices.

Method Embodiment 2A. The method of Method Embodiment 2, wherein determining (319), for each of a plurality of individual interfering devices, the individual interfering device's expected interference to at least the first protected zone is made by estimating the interference which will be made to a single point (e.g., a single location) in the first protected zone.

Method Embodiment 2AB. The method of Method Embodiment 2A, wherein determining (319), for each of a plurality of individual interfering devices, the individual interfering device's expected interference to at least the first protected zone does not include estimating interference from an individual device to multiple points (e.g., multiple locations) in the first protected zone.

Method Embodiment 3. The method of Method Embodiment 1, further comprising: determining (362) an interference quota for each interfering device in the first interference zone (e.g., by dividing (364) the interference quota for the first interference zone by the number of interfering devices in the first interference zone); and determining (362) an interference quota for each interfering device in the second interference zone (e.g., by dividing (364) the interference quota for the second interference zone by the number of interfering devices in the second interference zone).

Method Embodiment 4. The method of Method Embodiment 1, wherein dividing (334) the first interference neighborhood into a first plurality of interference zones includes dividing the first interference neighborhood based on: i) interfering devices in different areas of the first neighborhood, ii) expected interference from interfering devices in different areas of the first neighborhood and/or ii) pathloss information based on the topology of different areas of the first neighborhood.

Method Embodiment 5. The method of Method Embodiment 4, wherein dividing (334) the first interference neighborhood into a first plurality of interference zones includes dividing the first interference neighborhood into zones corresponding to different path losses to the protected device, said first interference zone having a lower path loss to the first protected device than said second interference zone.

Method Embodiment 6. The method of Method Embodiment 5, wherein dividing (334) the first interference neighborhood into a first plurality of interference zones, includes dividing the first interference neighborhood to include fewer interfering devices in said first interference zone (e.g., which has lower path loss) than the number of interfering devices included in said second interference zone (e.g., include more devices in second zone since individual interference devices in that zone are less likely to cause interference due to the greater path loss to the protected device for devices in the second zone than the first interference zone).

Method Embodiment 7. The method of Method Embodiment 6, wherein allocating (360) an interference quota to each of the interference zones in the first plurality of interference zones includes allocating a larger interference quota to the second interference zone than the first interference zone.

Method Embodiment 9. The method of Method Embodiment 8, further comprising: receiving (314) protection zone information from one or more other spectrum access controllers; and revising (318) (e.g., change the shape or size) the first set of protection zones based on the received protection zone information.

Method Embodiment 10. The method of Method Embodiment 1, wherein the interfering devices are non-PAL (non-Priority Access License) CBSDs.

Method Embodiment 11. The method of Method Embodiment 10, wherein the protected device is a PAL (Priority Access Licensees) base station.

Method Embodiment 11A. The method of Method Embodiment 1, further comprising: receiving (302) a signal indicating a DPA (Dynamic Protection Area) activation; and reassigning (304) the protected device to use a secondary channel (e.g., a non-PAL channel which is unaffected by the DPA activation, e.g. a shared spectrum channel which supports incumbent users and GAA (General Availability Access) users but for which PAL licenses are not granted) in response to said signal.

Method Embodiment 11A1. The method of Method Embodiment 11A, wherein the secondary channel is one of the channels within shared frequency spectrum of 3650 MHz-3700 MHz, and wherein the protected device was moved from a PAL channel, which was its primary channel, said primary channel being within shared frequency spectrum of 3550 MHz-3650 MHz.

Method Embodiment 11B. The method of Method Embodiment 11A, wherein said steps of: determining (320) a first interference neighborhood around the first protected zone; dividing (334) the first interference neighborhood into a first plurality of interference zones; and allocating (360) an interference quota to each of the interference zones in the first plurality of interference zones is performed in response to the reassignment of the protected device to use GAA channel spectrum.

Method Embodiment 11BA. The method of Method Embodiment 11B, wherein said reassignment is for a short term period (e.g., several minutes or a few hours but normally less than a day).

Method Embodiment 11C. The method of Method Embodiment 11, wherein the interfering devices and the protected device use GAA channel spectrum following said reassignment of the protected device.

Method Embodiment 11D. The method of Method Embodiment 11, wherein the interfering devices are GAA CBSDs (Citizens Broadband Radio Service Devices).

NUMBERED LIST OF EXEMPLARY APPARATUS EMBODIMENTS

Apparatus Embodiment 1. A first spectrum access controller (SAC) (202 or 400), comprising: memory (408); and a processor (402) configured to control the SAC to: determine (306) a protection contour of a protected entity; divide (308) the protection contour into a first set of protection zones, said first set of protected zones including at least a first protected zone and a second protected zone; determine (320) a first interference neighborhood around the first protected zone; divide (334) the first interference neighborhood into a first plurality of interference zones, said first plurality of interference zones including at least a first interference zone and a second interference zone; allocate (360) an interference quota to each of the interference zones in the first plurality of interference zones, said allocating including allocating a first interference quota to the first interference zone and a second interference quota to the second interference zone; and communicate (368) control messages to one or more interfering devices in the first interference zone to limit the amount of interference from the first interference zone to stay within said first interference quota.

Apparatus Embodiment 1A. The first SAC (202 or 400) of Apparatus Embodiment 1, wherein allocating (360) an interference quota to each of the interference zones in the first plurality of interference zones is performed in a non-iterative manner with the allocation being made and used to limit the amount of interference to the protection zone.

Apparatus Embodiment 1AB. The first SAC (202 or 400) of Apparatus Embodiment 1, wherein allocating (360) an interference quota to each of the interference zones in the first plurality of interference zones is performed without taking into consideration unused portions of allocated interference quotas that are allocated to some interference zones (e.g., other interference zones in the first plurality of interference zones which may not or do not use their full quota).

Apparatus Embodiment 1B. The first SAC (202 or 400) of Apparatus Embodiment 1, where the processor (402) is further configured to control the first SAC to: receive (314) protection zone information from one or more other spectrum access controllers (e.g., information indicating the size, shape and location of one or more protection zones recognized and known to a spectrum access controller); and revise (318) the first set of protection zones (e.g., change the shape, size and/or location of one or more protection zones in the first set of protection zones) based on the received protection zone information.

Apparatus Embodiment 1BA. The first SAC (202 or 400) of Apparatus Embodiment 1B, wherein the processor (402) is further configured to control the first SAC to: communicate (312) first protection zone information (e.g. indicating the determined size, shape and location of protection zones in said first set of protection zones) to said one or more other spectrum access controllers prior to receiving (314) said protection zone information from one or more other spectrum access controllers.

Apparatus Embodiment 1C. The first SAC (202 or 400) of Apparatus Embodiment 1, wherein the processor is further configured to control the first SAC to: receive (338) interference zone information from one or more other spectrum access controllers (e.g., information indicating the size, shape and/or location of one or more interference zones determined by one or more of the other spectrum access controllers); and revise (342) one or more interference zones based on the received interference some information (e.g., change the size, shape and/or location of one or more interference zones) prior to performing said step of allocating (360) an interference quota to each of the interference zones in the first plurality of interference zones.

Embodiment 1D. The first SAC (202 or 400) of Apparatus Embodiment 1C, wherein the processor (402) is further configured to control the first SAC to: communicate (336) first interference zone information (e.g., indicating the determined size, shape and location of interference zones in said first set of interference zones) to said one or more other spectrum access controllers prior to receiving (338) said interference zone information from the one or more other spectrum access controllers.

Apparatus Embodiment 1E. The first SAC (202 or 400) of Apparatus Embodiment 1, wherein the processor (402) is further configured to control the first SAC to: receive interference quota information (354) from one or more other spectrum access controllers (e.g., from at least one spectrum access controller); and revise (358) the interference quotas allocated to one or more of the interference zones in the first plurality of interference zones prior to communicating (368) control messages to one or more interfering devices in the first interference zone.

Apparatus Embodiment 1F. The first SAC of Apparatus Embodiment 1E, wherein the processor is further configured to control the first SAC to: communicate (352) determined interference quotas for interference zones in said first set of interference zones to one or more other spectrum access controllers prior to receiving said interference quota information form the one or more other spectrum access controllers.

Apparatus Embodiment 2. The first SAC (202 or 400) of Apparatus Embodiment 1, wherein the processor (402) is further configured to control the first SAC to: determine (319), for each of a plurality of individual interfering devices, the individual interfering device's expected interference to at least the first protected zone; and wherein determining (320) a first interference neighborhood around the first protected zone is based on determined expected interference from one or more individual interfering devices.

Apparatus Embodiment 2A. The first SAC (202 or 400) of Apparatus Embodiment 2, wherein determining (319), for each of a plurality of individual interfering devices, the individual interfering device's expected interference to at least the first protected zone is made by estimating the interference which will be made to a single point (e.g., a single location) in the first protected zone.

Apparatus Embodiment 2AB. The first SAC (202 or 400) of Apparatus Embodiment 2A, wherein determining (319), for each of a plurality of individual interfering devices, the individual interfering device's expected interference to at least the first protected zone does not include estimating interference from an individual device to multiple points (e.g., multiple locations) in the first protected zone.

Apparatus Embodiment 3. The first SAC (202 or 400) of Apparatus Embodiment 1, wherein the processor (402) is further configured to control the first SAC to: determine (362) an interference quota for each interfering device in the first interference zone (e.g., by dividing (364) the interference quota for the first interference zone by the number of interfering devices in the first interference zone); and determine (362) an interference quota for each interfering device in the second interference zone (e.g., by dividing (364) the interference quota for the second interference zone by the number of interfering devices in the second interference zone).

Apparatus Embodiment 4. The first SAC (202 or 400) of Apparatus Embodiment 1, wherein dividing (334) the first interference neighborhood into a first plurality of interference zones includes dividing the first interference neighborhood based on: i) interfering devices in different areas of the first neighborhood, ii) expected interference from interfering devices in different areas of the first neighborhood and/or ii) pathloss information based on the topology of different areas of the first neighborhood.

Apparatus Embodiment 5. The first SAC (202 or 400) of Apparatus Embodiment 4, wherein dividing (334) the first interference neighborhood into a first plurality of interference zones includes dividing the first interference neighborhood into zones corresponding to different path losses to the protected device, said first interference zone having a lower path loss to the first protected device than said second interference zone.

Apparatus Embodiment 6. The first SAC (202 or 400) of Apparatus Embodiment 5, wherein dividing (334) the first interference neighborhood into a first plurality of interference zones, includes dividing the first interference neighborhood to include fewer interfering devices in said first interference zone (e.g., which has lower path loss) than the number of interfering devices included in said second interfering zone (e.g., include more devices in second zone since individual interference devices in that zone are less likely to cause interference due to the greater path loss to the protected device for devices in the second zone than the first interference zone).

Apparatus Embodiment 7. The first SAC (202 or 400) of Apparatus Embodiment 6, wherein allocating (360) an interference quota to each of the interference zones in the first plurality of interference zones includes allocating a larger interference quota to the second interference zone than the first interference zone.

Apparatus Embodiment 9. The first SAC (202 or 400) of Apparatus Embodiment 1, wherein the processor (402) is further configured to control the first SAC to: receive (314) protection zone information from one or more other spectrum access controllers; and revise (318) (e.g., change the shape or size) the first set of protection zones based on the received protection zone information.

Apparatus Embodiment 10. The first SAC (202 or 400) of Apparatus Embodiment 1, wherein the interfering devices are non-PAL (non-Priority Access License) CBSDs.

Apparatus Embodiment 11. The first SAC (202 or 400) of Apparatus Embodiment 10, wherein the protected device is a PAL (Priority Access Licensees) base station.

Embodiment 11A. The first SAC (202 or 400) of Apparatus Embodiment 1, wherein said first SAC (202 or 400) is a SAS (201); wherein the processor (402) is further configured to: receive a signal indicating a DPA (Dynamic Protection Area) activation; and reassign the protected device to use a secondary channel (e.g., a non-PAL channel which is unaffected by the DPA activation, e.g. a shared spectrum channel which supports incumbent users and GAA (General Availability Access) users but for which PAL licenses are not granted) in response to said signal.

Apparatus Embodiment 11A1. The first SAC (202 or 400) of Apparatus Embodiment 11A, wherein the secondary channel is one of the channels within shared frequency spectrum of 3650 MHz-3700 MHz, and wherein the protected entity was moved from a PAL channel, which was its primary channel, said primary channel being within shared frequency spectrum of 3550 MHz-3650 MHz.

Apparatus Embodiment 11B. The first SAC (202 or 400) of Apparatus Embodiment 11A, wherein said steps of: determining (320) a first interference neighborhood around the first protected zone; dividing (334) the first interference neighborhood into a first plurality of interference zones; and allocating (360) an interference quota to each of the interference zones in the first plurality of interference zones is performed in response to the reassignment of the protected device to use GAA channel spectrum.

Apparatus Embodiment 11BA. The first SAC (202 or 400) of Apparatus Embodiment 11B, wherein said reassignment is for a short term period (e.g., several minutes or a few hours but normally less than a day).

Apparatus Embodiment 11C. The first SAC (202 or 400) of Apparatus Embodiment 11, wherein the interfering devices and the protected device use GAA channel spectrum following said reassignment of the protected device.

Apparatus Embodiment 11D. The first SAC (202 or 400) of Apparatus Embodiment 11, wherein the interfering devices are GAA CBSDs (Citizens Broadband Radio Service Devices).

Numbered List of Exemplary Non-Transitory Computer Readable Medium Embodiments

Non-Transitory Computer Readable Medium Embodiment 1.

A non-transitory computer readable medium (408) including processor executable instructions which when executed by a processor (402) of a first spectrum access controller (SAC) (202 or 400), control the first SAC (202 or 400) to: determine (306) a protection contour of a protected entity; divide (308) the protection contour into a first set of protection zones, said first set of protected zones including at least a first protected zone and a second protected zone; determine (320) a first interference neighborhood around the first protected zone; divide (334) the first interference neighborhood into a first plurality of interference zones, said first plurality of interference zones including at least a first interference zone and a second interference zone; allocate (360) an interference quota to each of the interference zones in the first plurality of interference zones, said allocating including allocating a first interference quota to the first interference zone and a second interference quota to the second interference zone; and communicate (368) control messages to one or more interfering devices in the first interference zone to limit the amount of interference from the first interference zone to stay within said first interference quota.

Various embodiments are directed to apparatus, e.g., spectrum access controllers (SACs), protected devices, e.g. PAL base stations, interfering devices, e.g. a non-PAL CBSDs (GAA CBSDs), other control devices, UEs, access points, a device including a AMF, a device including a UDM, a device including a SMF, a device including a PCF, a device including a UPF, a server, a device including a N3IWF, a device including a TNGF, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a spectrum access controller (SAC), a protected device, e.g. a PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and an MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a spectrum access controller (SAC), a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a spectrum access controllers (SAC), a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a spectrum access controller (SAC), a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a spectrum access controller (SAC), a protected device, e.g. PAL base station, an interfering device, e.g. a non-PAL CBSD (GAA CBSD), other control device, UE, an access point, a device including a AMF, a device including a UDM, a device including a SMF, a device including a PCF, a device including a UPF, a server, a device including a N3IWF, a device including a TNGF, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a spectrum access controller (SAC), a protected device, e.g. PAL base station, an interfering device, e.g. a non-PAL CBSD (GAA CBSD), other control devices, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Various method and apparatus in accordance with the present invention are well suited for supporting spectrum sharing the CBRS band (3550-3700 MHz) and for protecting PAL user devices during DPA activations.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed:

1. A method of operating a first spectrum access controller (SAC), the method comprising:
   determining a protection contour of a protected entity;
   dividing the protection contour into a first set of protection zones, said first set of protected zones including at least a first protected zone and a second protected zone;
   determining a first interference neighborhood around the first protected zone;
   dividing the first interference neighborhood into a first plurality of interference zones, said first plurality of interference zones including at least a first interference zone and a second interference zone;
   allocating an interference quota to each of the interference zones in the first plurality of interference zones, said allocating including allocating a first interference quota to the first interference zone and a second interference quota to the second interference zone; and
   communicating control messages to one or more interfering devices in the first interference zone to limit the amount of interference from the first interference zone to stay within said first interference quota.

2. The method of claim 1, further comprising:
   determining, for each of a plurality of individual interfering devices, the individual interfering device's expected interference to at least the first protected zone; and
   wherein determining a first interference neighborhood around the first protected zone is based on determined expected interference from one or more individual interfering devices.

3. The method of claim 1, further comprising:
   determining an interference quota for each interfering device in the first interference zone; and
   determining an interference quota for each interfering device in the second interference zone.

4. The method of claim 1, wherein dividing the first interference neighborhood into a first plurality of interference zones includes dividing the first interference neighborhood based on: i) interfering devices in different areas of the first interference neighborhood, ii) expected interference from interfering devices in different areas of the first interference neighborhood or ii) pathloss information based on the topology of different areas of the first interference neighborhood.

5. The method of claim 4, wherein dividing the first interference neighborhood into a first plurality of interference zones includes dividing the first interference neighborhood into zones corresponding to different path losses to the protected entity, said first interference zone having a lower path loss to the protected entity than a path loss of said second interference zone to the first protected entity.

6. The method of claim 5, wherein dividing the first interference neighborhood into a first plurality of interference zones, includes dividing the first interference neighborhood to include fewer interfering devices in said first interference zone than the number of interfering devices included in said second interference zone.

7. The method of claim 6, wherein allocating an interference quota to each of the interference zones in the first plurality of interference zones includes allocating a larger interference quota to the second interference zone than an interference quota allocated to the first interference zone.

8. The method of claim 1, further comprising:
   receiving protection zone information from one or more other spectrum access controllers; and
   revising the first set of protection zones based on the received protection zone information.

9. The method of claim 1, wherein the interfering devices are non-PAL (non-Priority Access License) CBSDs.

10. The method of claim 9, wherein the protected entity is a PAL (Priority Access License) base station.

11. A first spectrum access controller (SAC), comprising:
    memory; and
    a processor configured to control the SAC to:
       determine a protection contour of a protected entity;
       divide the protection contour into a first set of protection zones, said first set of protected zones including at least a first protected zone and a second protected zone;
       determine a first interference neighborhood around the first protected zone;
       divide the first interference neighborhood into a first plurality of interference zones, said first plurality of interference zones including at least a first interference zone and a second interference zone;
       allocate an interference quota to each of the interference zones in the first plurality of interference zones, said allocating including allocating a first interference quota to the first interference zone and a second interference quota to the second interference zone; and
       communicate control messages to one or more interfering devices in the first interference zone to limit the amount of interference from the first interference zone to stay within said first interference quota.

12. The first SAC of claim 11, wherein the processor is further configured to control the first SAC to:
    determining, for each of a plurality of individual interfering devices, the individual interfering device's expected interference to at least the first protected zone; and
    wherein determining a first interference neighborhood around the first protected zone is based on determined expected interference from one or more individual interfering devices.

13. The first SAC of claim 11, wherein the processor is further configured to control the first SAC to:
    determine an interference quota for each interfering device in the first interference zone; and
    determine an interference quota for each interfering device in the second interference zone.

14. The first SAC of claim 11, wherein dividing the first interference neighborhood into a first plurality of interference zones includes dividing the first interference neighborhood based on: i) interfering devices in different areas of the first interference neighborhood, ii) expected interference from interfering devices in different areas of the first interference neighborhood or ii) pathloss information based on the topology of different areas of the first interference neighborhood.

15. The first SAC of claim 14, wherein dividing the first interference neighborhood into a first plurality of interference zones includes dividing the first interference neighborhood into zones corresponding to different path losses to the protected entity, said first interference zone having a lower path loss to the protected entity than a path loss of said second interference zone to said protected entity.

16. The first SAC of claim 15, wherein dividing the first interference neighborhood into a first plurality of interference zones, includes dividing the first interference neighborhood to include fewer interfering devices in said first interference zone than the number of interfering devices included in said second interference zone.

17. The first SAC of claim 16, wherein allocating an interference quota to each of the interference zones in the first plurality of interference zones includes allocating a larger interference quota to the second interference zone than an interference quota allocated to the first interference zone.

18. The first SAC of claim 11, wherein the processor is further configured to control the first SAC to:
receive protection zone information from one or more other spectrum access controllers; and
revise the first set of protection zones based on the received protection zone information.

19. The first SAC of claim 18, wherein the interfering devices are non-PAL (non-Priority Access License) CBSDs.

20. A non-transitory computer readable medium including processor executable instructions which when executed by a processor of a first spectrum access controller (SAC), control the first SAC to:
determine a protection contour of a protected entity;
divide the protection contour into a first set of protection zones, said first set of protected zones including at least a first protected zone and a second protected zone;
determine a first interference neighborhood around the first protected zone;
divide the first interference neighborhood into a first plurality of interference zones, said first plurality of interference zones including at least a first interference zone and a second interference zone;
allocate an interference quota to each of the interference zones in the first plurality of interference zones, said allocating including allocating a first interference quota to the first interference zone and a second interference quota to the second interference zone; and
communicate control messages to one or more interfering devices in the first interference zone to limit the amount of interference from the first interference zone to stay within said first interference quota.

* * * * *